(12) United States Patent
Gilman

(10) Patent No.: US 10,992,678 B1
(45) Date of Patent: Apr. 27, 2021

(54) INTERNET ACCESS CONTROL AND REPORTING SYSTEM AND METHOD

(71) Applicant: Sean Gilman, Rye, NY (US)

(72) Inventor: Sean Gilman, Rye, NY (US)

( * ) Notice: Subject to any disclaimer, the term of this patent is extended or adjusted under 35 U.S.C. 154(b) by 0 days.

(21) Appl. No.: 15/266,550

(22) Filed: Sep. 15, 2016

Related U.S. Application Data

(60) Provisional application No. 62/218,721, filed on Sep. 15, 2015.

(51) Int. Cl.
| | |
|---|---|
| *H04L 29/06* | (2006.01) |
| *G06F 21/62* | (2013.01) |
| *H04L 29/08* | (2006.01) |
| *H04L 29/12* | (2006.01) |

(52) U.S. Cl.
CPC ........ *H04L 63/102* (2013.01); *H04L 61/1511* (2013.01); *H04L 67/22* (2013.01); *G06F 21/62* (2013.01); *H04L 63/08* (2013.01); *H04L 63/20* (2013.01)

(58) Field of Classification Search
CPC .............................. H04L 63/102; G06F 21/62
See application file for complete search history.

(56) References Cited

U.S. PATENT DOCUMENTS

| | | | |
|---|---|---|---|
| 5,987,611 A | 11/1999 | Freund | |
| 6,256,671 B1 * | 7/2001 | Strentzsch | ............... G06F 21/00 709/227 |
| 7,356,703 B2 | 4/2008 | Chebolu | |
| 7,769,766 B1 * | 8/2010 | Dubrovsky | ........... G06F 16/957 707/754 |
| 8,005,913 B1 * | 8/2011 | Carlander | ........... G06F 21/6218 709/207 |
| 8,255,452 B2 | 8/2012 | Piliouras | |
| 8,260,902 B1 * | 9/2012 | DeGraaf | ............. H04L 63/0272 709/220 |
| 8,347,394 B1 * | 1/2013 | Lee | ..................... H04L 61/1511 726/22 |
| 8,797,461 B2 | 8/2014 | Davis | |
| (Continued) | | | |

FOREIGN PATENT DOCUMENTS

WO   WO 2013180673   5/2013

*Primary Examiner* — Jason Chiang
(74) *Attorney, Agent, or Firm* — Davidson Berquist Jackson & Gowdey LLP

(57) ABSTRACT

An Internet Access Control and Reporting System (IACRS) for managing internet access is described. The IACRS is designed to allow those administering or controlling access to the internet (for example supervisors, parents, etc.) to manage Internet access of others (for example children, charges, or employees). The IACRS is able to control the type of content available, the amount of time on the Internet, time of day access rules, as well as conditional rules based on behavior. While well-suited for home use, the system is directly applicable and effective in other residential settings, business (office, hotel, etc.), academic environments and community centers. The features or subsystems of the IACRS include DNS user profiling, user based content filtering, user rule based filtering, including using DNS and active firewall. Finally, behavior based product purchasing rules are used to create incentive programs based on user behavior and/or completion of goals to allow purchase of a product. finally rules, behavior based rules, behavior based purchasing and reporting.

21 Claims, 27 Drawing Sheets

(56) References Cited

U.S. PATENT DOCUMENTS

| | | | |
|---|---|---|---|
| 8,819,804 B1 | 8/2014 | Sankruthi | |
| 2003/0131073 A1* | 7/2003 | Lucovsky | G06F 21/335 |
| | | | 709/219 |
| 2003/0182420 A1* | 9/2003 | Jones | G06F 17/30867 |
| | | | 709/224 |
| 2004/0059941 A1* | 3/2004 | Hardman | H04L 63/08 |
| | | | 726/7 |
| 2005/0021975 A1* | 1/2005 | Liu | H04L 63/0281 |
| | | | 713/182 |
| 2007/0136785 A1* | 6/2007 | Warrier | H04L 63/102 |
| | | | 726/2 |
| 2008/0270240 A1* | 10/2008 | Chu | G06Q 10/06375 |
| | | | 705/14.11 |
| 2009/0043900 A1* | 2/2009 | Barber | H04L 29/12066 |
| | | | 709/228 |
| 2011/0231769 A1* | 9/2011 | Tovar | H04L 63/10 |
| | | | 715/735 |
| 2011/0235549 A1* | 9/2011 | Ahlers | H04L 41/08 |
| | | | 370/255 |
| 2012/0198034 A1* | 8/2012 | Avirneni | H04L 61/1511 |
| | | | 709/221 |
| 2016/0330287 A1* | 11/2016 | Smith | H04L 67/18 |

* cited by examiner

FIG. 9

KIDZILA.COM

KIDZILA | HOME | FAMILY▾ DOMAIN▾ PROXY▾ CURATOR▾ CHANGE PASSWORD ⏻LOGOUT

LOGGED IN AS: SEAN    IP ADDRESS: 166.137.252.90    28TH JULY 2015 18:58

THOR
DETAIL REPORT  SETTINGS  RULES  TIME BLOCK  RESPONSIBILITIES▾  TASKS▾
STATUS: ONLINE NOW                               EDU ALLOWED ✓   OPEN ALLOWED ✕
ONLINE TODAY: 1.82 HOURS  LAST ACTIVITY: JULY 28, 2015, 6:57P.M. ACCEPTED (147) DENIED (0)

| RESPONSIBILITIES | STATUS | |
|---|---|---|
| GET UP IN THE MORNING ON TIME | | MARK COMPLETE |

| TASKS | STATUS | LINK |
|---|---|---|

TROY
DETAIL REPORT  SETTINGS  RULES  TIME BLOCK  RESPONSIBILITIES▾  TASKS▾
STATUS: ONLINE NOW                               EDU ALLOWED ✓   OPEN ALLOWED ✕
ONLINE TODAY: 1.82 HOURS  LAST ACTIVITY: JULY 28, 2015, 6:57P.M. ACCEPTED (147) DENIED (0)

| RESPONSIBILITIES | STATUS |
|---|---|
| FINISH HOMEWORK | ✓ |
| READ A BOOK FOR 30 MINUTES | ✓ |

| TASKS | STATUS | LINK |
|---|---|---|

SET INTERNET ACCESS RULES FOR THOR

ALLOWED THIS CHILD MARK RESPONSIBILITIES AS COMPLETE:
- ☐ • ONLY PARENTS ALLOWED
- ☐ • CHILD ALLOWED

ALLOWED THIS CHILD MARK GOALS AS COMPLETE:
- ☐ • ONLY PARENTS ALLOWED
- ☐ • CHILD ALLOWED

MAXIMUM HOURS ALLOWED ON THE INTERNET PER DAY: 24

BEFORE RESPONSIBILITIES ARE COMPLETE

| RATING | ENABLED |
|---|---|
| UNKNOWN | ☑ |
| EDUCATIONAL | ☑ |
| TECHNOLOGY | ☑ |
| SHOPPING | ☑ |
| MOVIES | ☑ |
| VIDEO SHARING | ☑ |
| SPORTS | ☐ |
| WEB MAIL | ☑ |
| SOCIAL NETWORKS | ☑ |
| ENTERTAINMENT | ☑ |
| GUNS | ☐ |
| GAMES | ☑ |
| HACKING | ☑ |
| POLITICS | ☐ |

WHEN ALL RESPONSIBILITIES ARE COMPLETE

| RATING | ENABLED |
|---|---|
| UNKNOWN | ☑ |
| EDUCATIONAL | ☑ |
| TECHNOLOGY | ☑ |
| SHOPPING | ☑ |
| MOVIES | ☑ |
| VIDEO SHARING | ☑ |
| FILE SHARING | ☑ |
| WEB MAIL | ☑ |
| SOCIAL NETWORKS | ☑ |

*FIG. 10*

| ADULTS | FIRST NAME |
|---|---|
| SEAN | SEAN |
| LEEANN | LEEANN |
| FLAVER | FRANK |
| BILLH | BILLH |
| JEFF | JEFF |

| CHILDREN | FIRST NAME |
|---|---|
| THOR | THOR |
| TROY | TROY |
| NATASHA | NATASHA |
| TYLER | TYLER |
| TEST | TEST |

| | | |
|---|---|---|
| HOME PHONE:: | | • THIS FIELD IS REQUIRED. |
| HOME ADDRESS:: | | • THIS FIELD IS REQUIRED. |
| HOME STATE:: | ALABAMA | • THIS FIELD IS REQUIRED. |
| HOME ZIP:: | | • THIS FIELD IS REQUIRED. |
| TIMEZONE:: | (GMT+0000) AFRICA/ABIDJAN | • THIS FIELD IS REQUIRED. |

[CANCEL]

MANAGE CURATED TASKS
SHOWING: ALL

| CREATED | STATUS | DESCRIPTION | AGES | LINK | MODIFY |
|---|---|---|---|---|---|
| JULY 19 2015, 7:53 P.M. | OPEN | A WILDLIFE REFUGE WHAT THIS VIDEO ABOUT A WILDLIFE REFUGES AND WRITE A REPORT. WOULD YOU LIKE TO WORK ON A WILDLIFE REFUGE? | 5-18 | HTTP://THEFUTURESCHANNEL.COM/VIDEOGALLERY/A-WILDLIFE-REFUGE/ | EDIT DELETE |
| JULY 19 2015, 7:59 P.M. | OPEN | LEARN A NEW MATH SKILL CREATE AN ACCOUNT ON MATHTV.COM AND WATCH A VIDEO ABOUT A MATH SKILL. | 5-10 | HTTP://WWW.MATHTV.COM/VIDEOS_BY_TOPIC | EDIT DELETE |
| JULY 19 2015, 8:01 P.M. | OPEN | COMPLETE A LESSON ON KHAN ACADEMY | 5-13 | HTTP://KHANACADEMY.ORG | EDIT DELETE |
| JULY 19 2015, 8:05 P.M. | OPEN | LEARN ABOUT PHOTOGRAPHY FROM AN MIT PROFESSOR | 9-17 | HTTP://OCW.MIT.EDU/COURSES/URBAN-STUDIES-AND-PLANNING/11-309J-SENSING-PLACE-PHOTOGRAPHY-AS-INQUIRY-FALL-2012/LECTURE-VIDEOS/ | EDIT DELETE |

| CREATE NEW TASK | CREATED>7DAYS | CREATED>14 DAYS | >10 YEARS AGE | <12 YEARS AGE | ACTIVE | INACTIVE |
| SHOW ALL | | | | | | |

FIG. 16

| | KIDZILA.COM/FORMS/ × | | | | | | | | | | | | — ☐ × |
|---|---|---|---|---|---|---|---|---|---|---|---|---|---|
| ← → C | 🗋 KIDZILA.COM/FORMS/REANGREVIEWES/ | | | | | | | | | | ⊕ ☆ ▣ | ♤ 🗩 ◎ | ≡ |
| KIDZILA | HOME | | | | | | FAMILY▼ DOMAIN▼ PROXY▼ CURATOR▼ CHANGE PASSWORD | | | | | | 🗗 LOGOUT |

50 OF 14760 UNAUDITED RATINGS

FILTER=NONE SORT=NONE

| ALL | UNKNOWN | EDUCATIONAL | TECHNOLOGY | SHOPPING | MOVIES | VIDEO | SHARING | WEB | SOCIAL | ENTERTAINMENT |
|---|---|---|---|---|---|---|---|---|---|---|
| NEW | NEW | NEW | NEW | NEW | NEW | NEW | NEW | NEW | NEW | NEW |
| OLD | OLD | OLD | OLD | OLD | OLD | OLD | OLD | OLD | OLD | OLD |

| CREATE DATE | OWNER | DOMAIN | STATE | RATING | | |
|---|---|---|---|---|---|---|
| JULY 29, 2015, 1:39 A.M | NONE | C3605.RNCDN3.COM | SUBMITTED | UNKNOWN | APPROVE | DELETE |
| JULY 28, 2015, 10:46 P.M. | NONE | FATBURNX.COM | SUBMITTED | UNKNOWN | APPROVE | DELETE |
| JULY 28, 2015, 10:46 P.M. | NONE | ALPHARUSHPRO.COM | SUBMITTED | UNKNOWN | APPROVE | DELETE |
| JULY 28, 2015, 10:46 P.M. | NONE | HASHTAGADS.COM | SUBMITTED | UNKNOWN | APPROVE | DELETE |
| JULY 28, 2015, 10:46 P.M. | NONE | JCIBJ.COM | SUBMITTED | UNKNOWN | APPROVE | DELETE |
| JULY 28, 2015, 10:09 P.M. | NONE | SWSELLER.COM | SUBMITTED | UNKNOWN | APPROVE | DELETE |
| JULY 28, 2015, 9:53 P.M. | NONE | GLOBALICONS.COM | SUBMITTED | UNKNOWN | APPROVE | DELETE |
| JULY 28, 2015, 9:53 P.M. | NONE | CORBIS.COM | SUBMITTED | UNKNOWN | APPROVE | DELETE |

| | | | | | |
|---|---|---|---|---|---|
| CREATED | STATUS | TYPE | DESCRIPTION | DAYS | MODIFY |
| JAN 29 2015, 8:40 P.M. | OPEN | RESPONSIBILITY | FINISH HOMEWORK | M T W TH FR | DELETE COMPLETE |
| MARCH 11 2015, 2:08 P.M. | OPEN | RESPONSIBILITY | READ A BOOK FOR 30 MINUTES | M T W TH FR | DELETE COMPLETE |
| MARCH 11 2015, 2:09 P.M. | OPEN | RESPONSIBILITY | PRACTICE MUSICAL INSTRUMENT FOR 30 MINUTES | M T W TH FR | DELETE COMPLETE |
| JAN 29 2015, 10:43 A.M. | OPEN | CURATED EDU | | W | DELETE COMPLETE |

MANAGE RESPONSIBILITIES FOR: TYLER

[RESPONSIBILITY] [CURATED EDU TASK] [CANCEL]

*FIG. 19*

```
┌─────────────────────────────────────────────────────────────────┐
│ ▭ KIDZILA.COM/FORMS/  × ▭                           ─ □ ×      │
│ ← → C  ▭ KIDZILA.COM/FORMS/MANAGETASKS/ID+7,VIEW=OPEN  ⊕ ☆ ...  │
│ KIDZILA │ HOME │  FAMILY▾ DOMAIN▾ PROXY▾ CURATOR▾ CHANGE PASSWORD  ⇨LOGOUT │
│                                                                  │
│ MANAGE TASKS FOR: TYLER                                          │
│ SHOWING OPEN                                                     │
│ ─────────────────────────────────────────────────────────────── │
│ CREATED        STATUS    DESCRIPTION         LINK           MODIFY│
│ JAN 29         OPEN      CREATE AN ACCOUNT AND  HTTP://KHANACADEMY.ORG/  DELETE │
│ 2015, 10:52              DO ONE LESSON.                          │
│ A.M.                                                             │
│                                                                  │
│    [SHOW COMPLETED] [SHOW OPEN] [SHOW ALL] [CREATED NEW TASK]    │
└─────────────────────────────────────────────────────────────────┘
```

*FIG. 20*

```
┌─────────────────────────────────────────────────────────────────┐
│ ▭ KIDZILA.COM  × ▭                                   ─ □ ×      │
│ ← → C  ▭ KIDZILA.COM                              ⊕ ☆ ...       │
│ KIDZILA │ HOME │  FAMILY▾ DOMAIN▾ PROXY▾ CURATOR▾ CHANGE PASSWORD  ⇨LOGOUT │
│                                                                  │
│ WELCOME GILMAN (TYLER)                                           │
│                                                                  │
│ MAX TIME ONLINE   24 HOURS     ACCEPTED ⊛     DENIED ⑧          │
│ ONLINE TODAY      3.8 HOURS    EDU ALLOWED ✓  OPEN ALLOWED ✗    │
│ ─────────────────────────────────────────────────────────────── │
│ RESPONSIBILITIES                    STATUS                       │
│ FINISH HOMEWORK                     [MARK COMPLETE]              │
│ READ A BOOK FOR 30 MINUTES          [MARK COMPLETE]              │
│ PRACTICE MUSICAL INSTRUMENT FOR     [MARK COMPLETE]              │
│ 30 MINUTES                                                       │
│ LEARN ONLINE                        [LEARN]                      │
│                                                                  │
│ TASKS                               STATUS       LINK            │
│ CREATE AN ACCOUNT AND DO ONE LESSON [COMPLETE]   HTTP://KHANACADAMY.ORG │
└─────────────────────────────────────────────────────────────────┘
```

INTERNET ACCESS CONTROL AND REPORTING SYSTEM AND METHOD

RELATED APPLICATIONS

This application claims priority of provisional patent application Ser. No. 62/218,721 filed on Sep. 15, 2015, which is hereby incorporated by reference in its entirety.

TECHNICAL FIELD

System and methods relate to controlling access to the internet by individual user profile.

BACKGROUND

Excessive Internet usage is a growing problem among families. Tech savvy children with a myriad of hardware devices are accessing the Internet in new ways with very little parental control. Parents generally need the ability to restrict Internet usage. For example, it would be helpful for parents to have a mechanism of limiting Internet usage based on time of day, by child (teenagers may get broader access than a 5-year-old), total time spent, and/or by type of content.

Additionally, parents desire a reporting mechanism that shows them what sites each child is accessing or attempting to access. Parents need these controls to work on a wide range of devices including processor driven devices such as stationary and portable computers including PCs and Macs, and mobile devices such as Tablets, minis, Smartphones and Android devices as well as miscellaneous electronic devices such as wearables including wristwatches. Furthermore, parents desire a system with high performance (the ability to stream video) and a system that works with electrical devices on the Internet of Things (IoT).

There are also other environments in addition to the family home or non-traditional home in which mechanisms for restricting usage and access as well as monitoring or reporting on usage and access to the Internet is desirable. In some environments, other abuses of internet uses may wish to be controlled such as overuse or hogging of bandwidth. These include environments in which children or mentally disabled are present, addictions are being treated, prisoners are present or other gathering of individuals. These environments may include residential environments such as apartment complexes, halfway houses, summer camps, office environments and public environments such as libraries, children schools, churches, community centers, prisons, hospitals, learning institutions, hotels, stadiums, and facilities and even the public café. In some circumstances, it is desirable to restrict usage or access in places where individuals are gathered for a limited or specific purpose for example rehabilitation centers, and environments in which gatherings are for religious or other reasons and beliefs. In short, any place that has an internet access point may desire and benefit from the systems and methods described.

SUMMARY

An Internet Access Control and Reporting System (IACRS) for managing internet access is described. The IACRS is designed to allow those administering or controlling access to the internet (for example supervisors, parents, etc.) to manage Internet access of others (for example children, charges, or employees). The IACRS is able to control the type of content available, the amount of time on the Internet, as well as conditional rules based on behavior. While well-suited for home use, the system is directly applicable and effective in other residential settings, business (office, hotel, etc.), academic environments and community centers. The IACRS described differs from other systems in its superior performance and level of control.

Most existing access control systems are either HTTP proxy based or Domain Name System (DNS) proxy based, each have weaknesses and drawbacks.

Traditional HTTP proxy servers work by funneling all requests and data through the proxy server and filtering content based on the URLs (or the hostname component of the URL) as well as data contents. This approach allows for fine grained controls however, it has the several drawbacks including reduced network performance, compatibility problems with many sites (HTTPS), privacy concerns, and poor scalability. Some examples of HTTP proxy systems can be found here:
https://en.wikipedia.org/wiki/Comparison_of_web_server_software (August 2015).

DNS Servers also called DNS filter servers (like GooglePublicDNS, opendns.com and ISP provider DNS servers) do not actually filter content because no content flows through them. Instead they make it difficult (not impossible) for users to find Internet content by refusing to resolve the host name in a URL if that site is blocked by a rule. When a user requests a blocked site the DNS filter simply returns the IP address of another server which in turn gives the user a standard "Site Blocked" web page. Because DNS filters do not handle content, they avoid many of the shortcomings of HTTP Proxy servers.

However, because the DNS protocol lacks the ability to send any user information, all users of a DNS proxy must share the same access profile. This makes access control systems based on DNS filters inherently inflexible in that all users must have the same access privileges and the access reporting cannot differentiate between users.

The IACRS described consists of several innovative subsystems or features which may be used in conjunction to provide a comprehensive IACRS. All or some of the features may be useful in many environments, for example in business or academic environments.

IACRS can be operated on most industry standard hardware with the proper programming.

The features or subsystems of the IACRS include DNS user profiling, user based content filtering using DNS and active firewall rules, behavior based rules, behavior based purchasing and reporting.

DNS User Profiling allows the core system to identify DNS requests as originating for a single individual. In turn, this allows the core system to apply a series of rules based on that user's profile. This also allows the core system to record the user that originated each request. (This is different than DNS proxies which can only know about a router IP address and are thus limited in the rules they can apply). This allows the core system to have a very sophisticated set of access rules while maintaining very detailed records. This level of detail is not possible on other systems as they lack key information about the actual user.

An Internet access control and reporting system for administering access by individual users of a network to the Internet wherein the type of content and amount of time on the Internet are controlled is described.

An Internet access control and reporting system for administering access by individual users of a network to the Internet wherein the type of content and amount of time on the Internet are controlled without the use of a Domain Name System (DNS) server is described.

An Internet access control and reporting system for controlling access to the Internet using conditional rules based upon behavior of an individual and/or behavior of a group of individuals is described.

An Internet access control and reporting system for controlling access to the Internet based on individual goals and/or group goals being met is described.

An Internet access control and reporting system for controlling access to the Internet based on the responsibilities is described.

An Internet access control and reporting system using a server for controlling access to the Internet on an individualized basis is described.

Behavior based rules for providing internet content based on the behavior of the user is described.

Behavior based purchasing rules which for example allow purchases as an incentive for positive behavior is described.

Reports, logs and report generation for the IACRS are also described. Many of these reports can be generated on a user basis or for a single user.

Internet access control systems having on-site and off-site devices are described. In one embodiment, the off-site device comprises:

a web server enabling system control, rule maintenance and usage reports;

a user database including data on users organized by user ID;

an access rules database with customized access rules associated with individual users in the user database; and a specialized domain name server;

wherein the customized access rules associated with an individual user are used and wherein an on-site device sends messages to the web server requesting user access to a requested internet website and identifying the individual user and wherein access is granted or blocked based upon the customized rules associated with individual users.

In another implementation, the internet access control system has an on-site device and an off-site device. The on-site device comprises:

a Specialized DNS Proxy service for forwarding DNS requests to the off-site device;

a Specialized Firewall for blocking and forwarding communication traffic;

an HTTP proxy service which forwards login messages to an off-site web server to check against a user database.

An internet access control system having on-site or a client facing device and an off-site device is described. In one embodiment, the on-site or client facing device comprises:

an inside port connecting an inside network;

an outside port connecting an outside network; and one or more processors and one or more memory devices configured to include:

an inside network address;

an outside network address;

a Specialized DNS Proxy Service which forwards DNS requests to a specialized domain name server;

an Option DNS Cache wherein requests and responses are cached for future reference;

an HTTP Proxy Service which forwards login messages to an off-site web server to check against a user database;

a specialized firewall wherein firewall rules are maintained for blocking and forwarding traffic between inside and outside interfaces;

a DHCP client for an outside network wherein different network addresses are maintained for inside and outside networks;

a DHCP server for an inside network wherein IP address are automatically assigned to a computing device connected to the inside network;

a map of IP addresses to MAC addresses;

a list of MAC addresses that have been previously authenticated against the internet access control systems off-site device;

an internet content ratings database wherein internet domains and content categories are mapped and stored; and a map of authentication tokens related to a user's IP address;

wherein DNS requests are received from network devices, processed, forwarded to a specialized domain name server and access to websites is provided or blocked based upon user specific access rules, internet content ratings and time of day.

The embodiment described above can further comprise an off-site device. The off-site device comprising:

a web server having system control, rule maintenance and usage reports;

a user database including data on users searchable by user ID;

an access rules database with individualized user specific access rules associated with users in the user database; and a specialized domain name server wherein the customized access rules are used and wherein an on-site the customer facing device sends messages to the web server requesting user access to internet websites and access is granted or restricted (blocked) based upon the user specific access rules associated with individual users.

Some embodiments of the internet access and control system have customized access rules that are customized based on one or more of the following: age of user, day of the week, elapsed time online, time of day, and behavior.

Some embodiments of the internet access and control system also grant or deny access to an IP address based upon whether an individual user's responsibilities and/or tasks are completed.

In some embodiments, the internet access and control systems include off-site devices comprising a database that stores a log of website requests received from a user ID.

Some embodiments of the internet access and control system comprise a report generator wherein a detailed report is generated about a user's on-line internet usage.

In an embodiment a method is used for controlling users having network devices from accessing websites based upon individual rules. More specifically, the method comprises:

receiving, at a first device, a DNS request from a user's network device requesting access to a website;

mapping, using the first device, a MAC address of the network device to a user ID;

sending the DNS request and the user ID to a second device;

identifying, using the user ID, a user profile stored in a database;

determine if the user ID has been used to log-in to the second device;

determine, using the user ID, if users on-line access time is exhausted;

determine, using access rules, if there is an exception for access to the requested website, if so then follow the exception;

determine if the requested website is a site categorized as educational;

determine, using the user profile, if sites categorized as educational are allowed for the user ID during current time of day;

determine, using the user profile, if the requested website is categorized in a category that is allowed during open time; and determine, using the user profile, if current time is an open time for the user ID;

wherein, when access rules required by the user profile have been met, the IP address for the requested website is provided to the network device.

In some embodiments, such as the preceding method, only one device is used. In other embodiments, such as the preceding method, a blocked site IP address is provided to the network device when access is denied to the website requested in a DNS request. In other embodiments, website access is not granted unless responsibilities and/or tasks are completed. In yet other embodiments, reports are generated of user website requests and/or reports of blocked IP addresses.

In one embodiment, an internet access and control system for controlling access by users to internet content using a computer with a microprocessor and memory is described. In an embodiment the IACRS system comprises:

one or more microprocessors and one or more memory devices configured to:
  communicate with a network device;
  receive a DNS request from the network device;
  map a MAC address of the network device to a user ID;
  locate, in a database, website access rules associated with the user ID; and
  determine whether the website access rules allow the DNS request from the network device to receive a resolved IP address response or a blocked IP address response based upon website content and time of day.

BRIEF DESCRIPTION OF THE DRAWINGS

FIG. 9 is an exemplary screenshot of a home page generally for use by a supervisor/parent showing status of various users and providing control over the users.

FIG. 10 is an exemplary screenshot of an interface page for use by a supervisor/parent to control various user rules on an individualized basis.

FIG. 14 is an exemplary screenshot of a page showing a basic family setup which allows for the addition or removal of users in a family.

FIG. 15 is an exemplary screenshot of a page allowing a supervisor/parent to control rules that apply to all members of a family.

FIG. 16 is an exemplary screenshot of a page allowing a designated Curator to create "Curated Tasks" that can then automatically be assigned to users on a schedule.

FIG. 17 is an exemplary screenshot of a page allowing a designated Curator to review and modify website ratings.

FIG. 18 is an exemplary screenshot of a page allowing a supervisor/parent to modify settings on the OSFD such as network configuration.

FIG. 19 is an exemplary screenshot of a page allowing a parent/supervisor to manage responsibilities and certain tasks assigned to a specific user.

FIG. 20 is an exemplary screenshot of a page allowing a parent/supervisor to manage tasks for a specific user.

FIG. 21 is an exemplary screenshot of a welcome or home page for a user/child interface showing open tasks and responsibilities. The page provides a mechanism for completing tasks and responsibilities as well as gaining access to reports and schedules.

FIG. 22 is an exemplary screenshot of a page allowing a user/child to complete a task. In the specific example, the task is a "web task" and the user must complete a lesson on an external site.

FIG. 23 is an exemplary screenshot of a page displaying an internet access report for a particular user. The displayed page shows responsibilities as well as recent activity for the particular user by date and time.

FIG. 24 is an exemplary screenshot of a page of internet access rules for a particular user by calendar and time of day which may be changed on an hourly basis.

FIG. 25 is an exemplary screenshot of a page used for proxy site configuration which allows for a number of users including allowed MAC addresses for devices. Also, current connections organized by user and MAC addresses are shown.

DETAILED DESCRIPTION

Methods and systems of controlling internet access as well as reporting on internet access are described. More particularly, methods and systems of controlling internet access on an individual basis and reporting on same are described.

DNS user profiling is used to identify DNS requests as originating from a single individual. The DNS user profiling provides the ability to apply rules based on a user's profile and log or record the user's requests.

This system enables the operator or administrator to control sophisticated Internet content access rules. The rules can be different for each user of the system and can be based on many factors. Some factors include: user role, calendar (e.g., time of day, day of week, holiday, season, etc.) category of content, cumulative access time per day, etc. By using DNS as a primary mechanism the system accomplishes very detailed filtering with no loss in performance. Therefore, high performance applications like video streaming can work well in this system. The DNS user profiling allows the system to establish the actual user of a DNS query. By using DNS user profiling with a database of user access rules, the system has an engine and method for controlling Internet access by checking rules.

This capability of controlling access to the Internet differs from other DNS based access control systems in that it is user based DNS whereas other systems are based on a site. In other words, an entire site operates on one set of content access rules, no distinguishing by user or group of users.

While the internet access control and reporting system described may be locally based, many embodiments described are for a centralized system. The centralized system allows for ease of user set-up, administration and use. The system components described below may all be located in one place on-site or off-site. Also, components that are described off-site may be moved on-site and vice versa. There is flexibility in where the system components located and software is executed.

Figure 1:
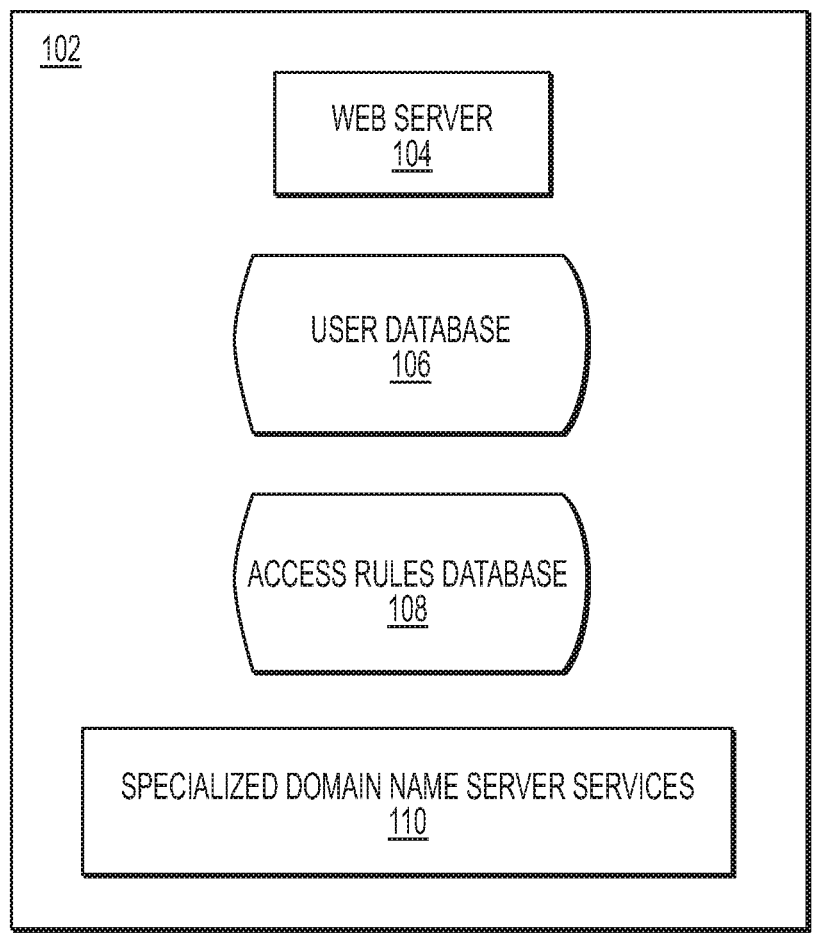
FIG. 1 illustrates an off-site device in accordance with the methods and systems for use in internet access control and reporting.
Figure 2A:
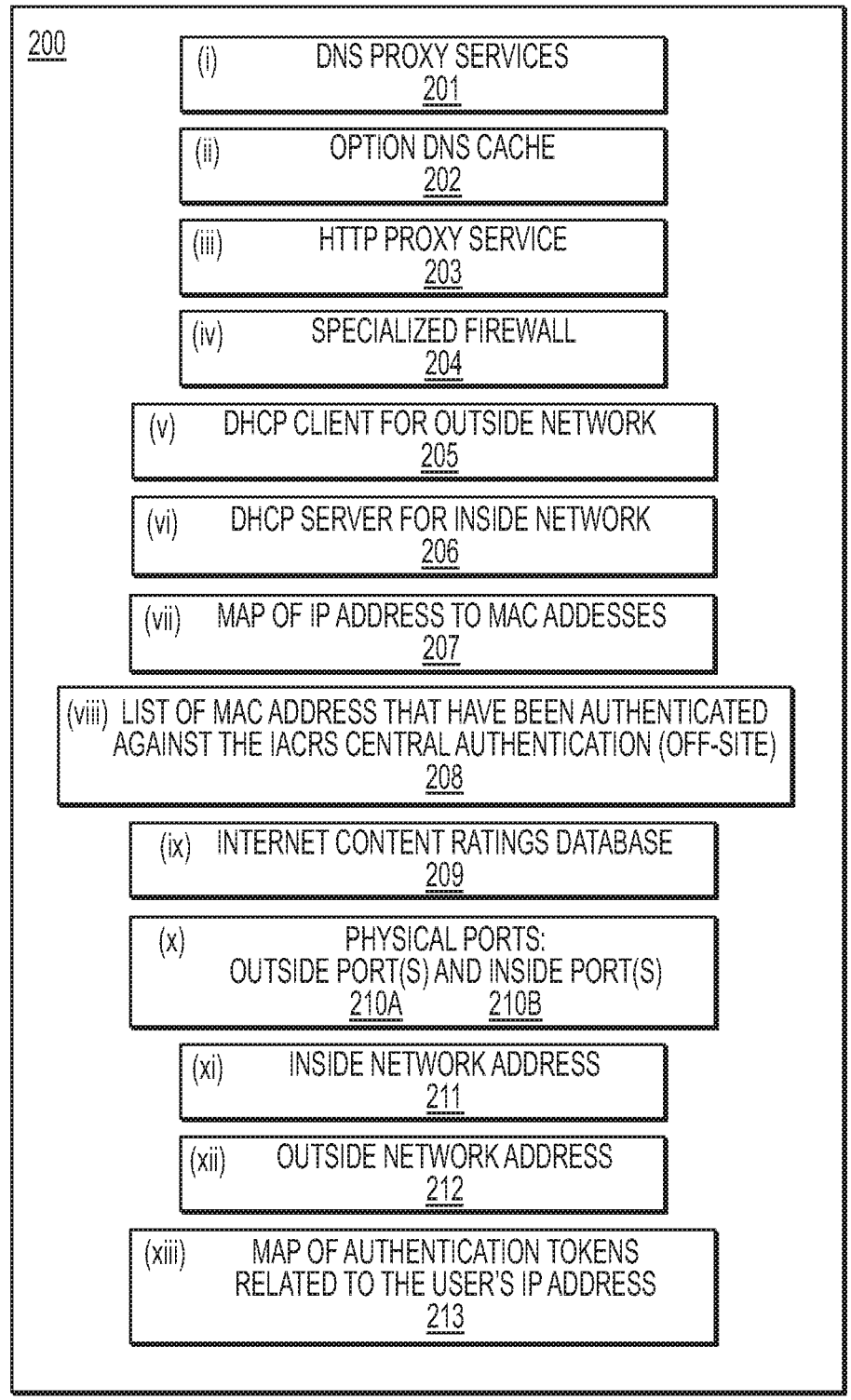
FIG. 2A illustrates an on-site device in accordance with the systems and methods for use in internet access control and reporting.
Figure 2B:
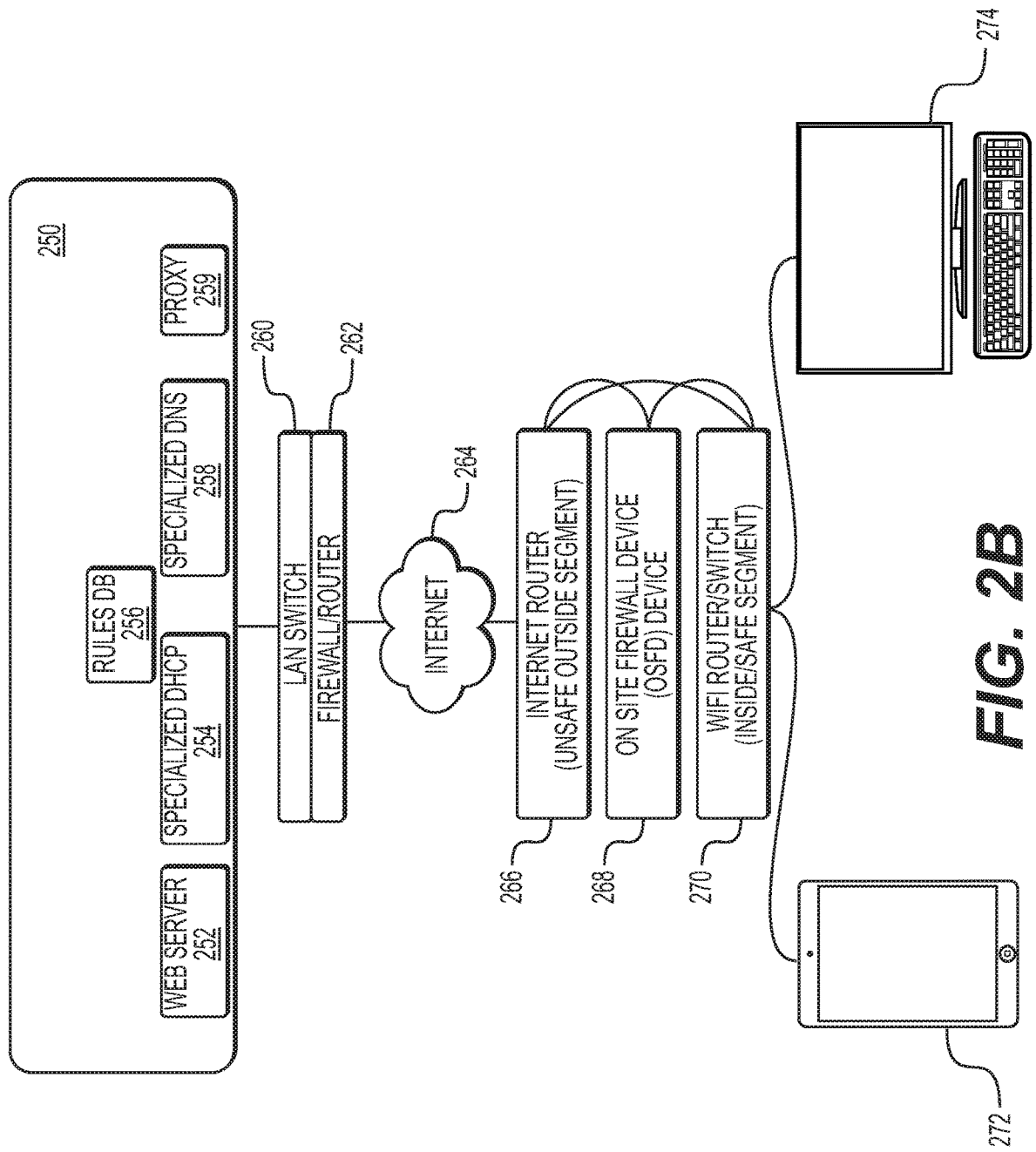
FIG. 2B is a depiction of the network architecture and hardware of an exemplary IACRS system including on-site and off-site configuration.

Referring generally to FIGS. 1, 2A and 2B, the Internet Access Control and Reporting System (IACRS) generally comprises off-site devices or components and on-site devices or components. In some embodiments, the IACRS is a centralized system. The IACRS is centralized by using off-site devices to control multiple on-site devices or components. In other words, a centralized IACRS service can be provided with an off-site control system supporting multiple on-site devices. The off-site device and the on-site device include one or more servers or one or processors and one or more memories. The servers or the processors and memories are configured to perform the indicated functions and store the indicated data.

The centralized IACRS system, method and service generally operates on the Internet or on a private network, e.g., a wireless phone network. In these systems, there may be a number of Local Area Networks or private networks utilizing the centralized components or devices of the IACRS.

Referring generally to FIGS. 1, 2A and 2B, in one example, the Internet Access Control and Reporting System (IACRS) centralized service comprises:

Off-Site Devices comprising:
  (A) Web Server (e.g., for system control, rule maintenance and usage reports) 104;
  (B) User Database (database of users) 106;
  (C) Access Rules Database (e.g., associated with users) 108; and
  (D) Specialized Domain Name Server Services (e.g., tied to customized rules) 110; and On-Site Firewall Device (OSFD) (one or more (e.g., each LAN)) comprises:
  (i) Specialized DNS Proxy Services (forwards DNS requests off-site for example to the Specialized Domain Name Server) 201;
  (ii) Option DNS Cache (caches requests and/or responses for improved performance of the system, frequent DNS requests and responses are cached) 202;
  (iii) HTTP Proxy Service (forwards login messages to Off-Site Web Server to check against user database) 203;
  (iv) Specialized Firewall (e.g., maintain firewall rules for blocking and forwarding traffic between inside and outside interfaces; e.g., by default all traffic from the inside to the outside network and outside to inside network will be blocked) 204;
  (v) DHCP Client for outside network (e.g., will maintain different network addresses for the inside and outside networks) 205;
  (vi) DHCP Server for inside network (automatically assigns an IP address to a computer (any electronic device e.g., smart phones, tablets, laptops, desktops, wifi thermostats, wifi speakers, wifi TVs, gaming devices, virtual reality headsets, etc.) from a defined range of numbers when a system is started) 206;
  (vii) Map of IP address to MAC addresses 207;
  (viii) List of MAC address that have been authenticated against the IACRS central authentication (Off-Site) 208;
  (ix) Internet Content Ratings Database (mapping internet domains and content categories) 209;
  (x) Physical Ports:
    (a) Outside port(s) (internet or insecure segment of network (e.g., ISP router)) 210a and
    (b) Inside port(s)) (used to connect interior or home network) 210b;
  (xi) Inside Network Address maintained 211;
  (xii) Outside Network Address maintained 212; and
  (xiii) Map of Authentication Tokens related to the user's IP address 213.

Referring to FIG. 1, in this example, the web server 104, user database 106, access rules database 108 and specialized domain name server 110 are shown as separate logical components. However, these components may be combined in an off-site physical device or devices 102. For example, the user database 106 and access rules database 108 may be combined into one database.

Also, the user database 106 and access rules database 108 are shown as part of the off-site device 102, however, these databases 106, 108 can easily be moved on-site or on the client-facing side of the IACRS system or to a third location. In some embodiments, it is more convenient and easier to manage these databases if they are located off-site at a central location.

By using data stored in the database or databases 106,108, the off-site device 102 is able to apply personalized rules or customized rules. Such personalized rules are used to determine whether a particular user should be allowed on-line access and additional whether specific DNS requests should be resolved into a responsive IP address. Rules are accessed that pertain to individual users and a determination is made as to whether the individual user is entitled to access to the requested website. Because rules are user-based each embodiment can be based on anything user specific including the actions and inactions of the user. For example, a rule may stipulate that a user must complete an online training course or an exercise class. Various scopes and implementations of the user interaction with the rule set may occur. In typical embodiments rules are stored in a relational database, however, other database designs may also be convenient. If a rule states that no access shall be provided during a time period, then all DNS requests will be redirected during that period. If however only a category (game web sites for example) of web sites is blocked during that time period, then only that category will be blocked for that period. Rules can reference groups of sites based on ratings or other criteria. Rules can also apply to individual sites. Either positive (allow access) or negative (deny access) access rules can be created. If a site is allowed, then the specialized domain name server 110 services the request and responds with the appropriate IP address. If a site is denied (e.g., access is blocked), then the specialized domain name server 110 services the request and responds with an IP address of a web server with a page indicated that the page has been blocked.

Referring to FIG. 2B, one example of a network architecture and configuration for a IACRS system is shown. On-site 268, 270 as well as off-site equipment 250 are shown. The off-site equipment 250 or central controls of the IACRS can be co-located or in the vicinity of the on-site equipment or may be far away. Firewalls (e.g., 262, 270 can provide any desired network separation. In this embodiment, on-site or near the site computing equipment is used for at least the WiFi router/switch 270 and the on-site fire wall device 268. Regardless of whether located on-site or not, the WiFi router/switch 270 and the firewall 268 are on the client side of the internet (or outside network) or client-facing. Wifi connected devices such as tablets and phones 272 are depicted communicating with a WiFi router/switch 270. Various tablets, phones and other mobile devices 272 may be used with the system. In some embodiments, the mobile devices are connected through WiFi, but other types of wireless connection are possible. A PC, a Mac and other computer devices 274 are also depicted and are shown hardwired to the WiFi Router Switch 270 on the interior network. Other types of electronic devices can also be connected in the inside network. On the opposite side of the firewall, on the other side of the on-site firewall device 268, an internet router 266 connects the inside network to the Internet 264 or outside network. The internet router 266, on-site firewall device 268 and WiFi router/switch 270 may operate on a single computing device or multiple computing devices. In one embodiment all three components, the internet router 266, the on-site firewall device 268 and the WiFi router/switch connected to the inside network are integrated into a single computing device.

An off-site device 250 is shown comprising a server cluster supporting a web server 252, DHCP 254, a rules database 256, a specialized DNS 258 and a proxy 259. Also a LAN switch 260 and firewall/router 262 are depicted as connected to the off-site equipment 250. In this embodiment, the firewall/router 262 is connected to the internet.

Various servers are used to support the network architecture shown in FIG. 2B. In the embodiment shown, a server cluster is used to act as the Off-Site device 250 for a centralized IACRS service. The cluster of servers includes a webserver 252, a DHCP 254, a database for the off-site device 256 and a specialized DNS 258 and supports any needed memory (not specifically shown).

Figure 2C:
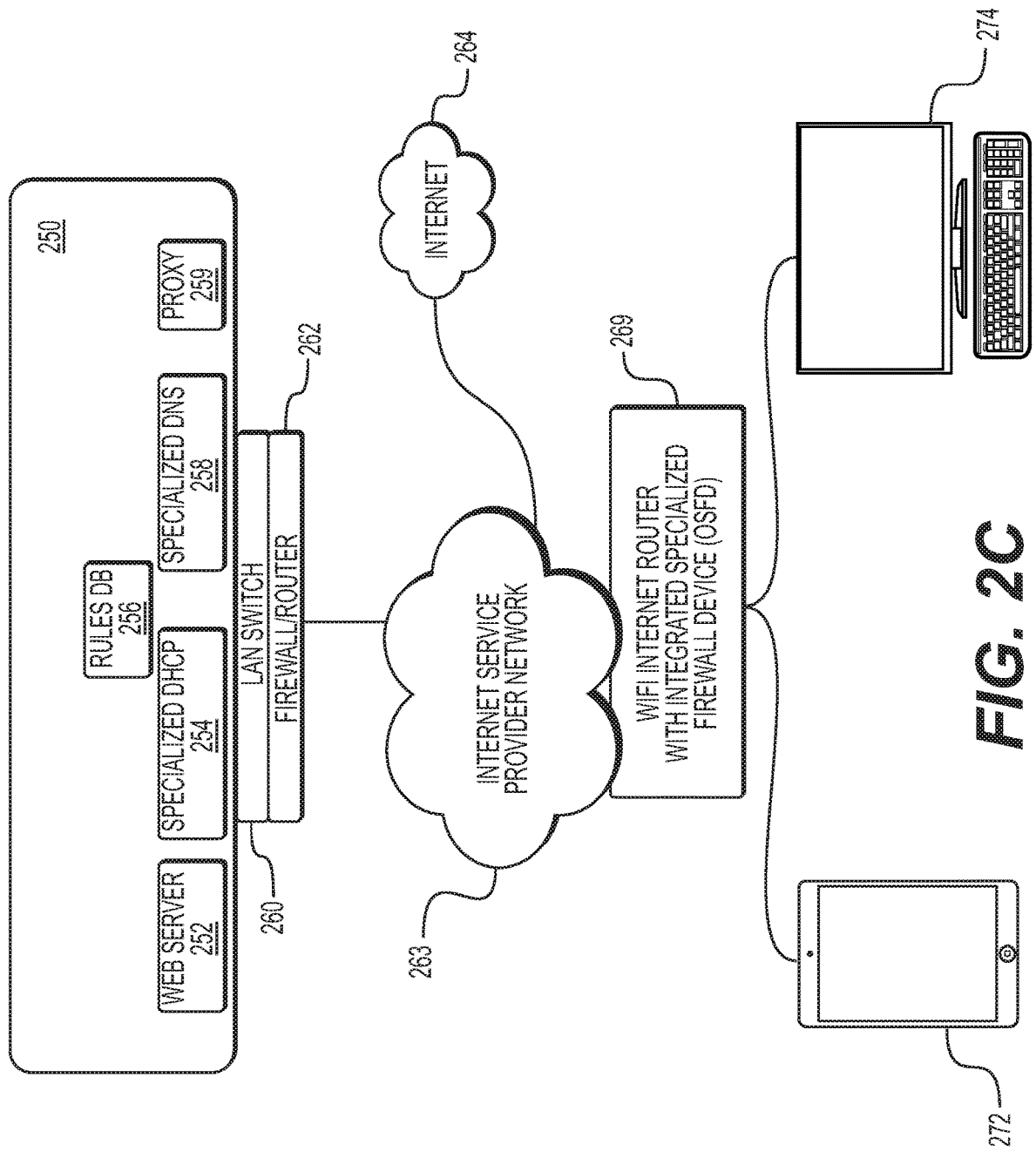
FIG. 2C is a depiction of the network architecture and hardware of an exemplary IACRS system using an internet service provider network.

FIG. 2C shows an exemplary IACRS service with off-site and on-site components 269. This example is an internet service provider model. In this embodiment, there is an internet service provider network 263 used to communicate through to the internet 264. Network devices such as tablets, phones 272 and PCs 274 are used by network users. Off-site components include a web server 252, a specialized DHCP 254, a rules database 256, a specialized DNS 258 and a proxy 259. In some embodiments, a server cluster is used for the off-site equipment. The rules database 256 includes the personalized rules for each user registered with the IACRS system. In some embodiments, the user ID information and other user profile information is stored in the rules database 256. A LAN switch 260 and firewall/router 262 may be collocated with the off-site device or at a separate location. The on-site components include a WiFi router with an integrated specialized Firewall device (OSFD) 269. This combined set of components perform similar functions to OSFD 268 and WiFi router/switch 270. The on-site components receive the DNS requests from the user's network devices, map the request to a specific user and provide the DNS request as well as the user information to the off-site equipment.

Figure 2D:
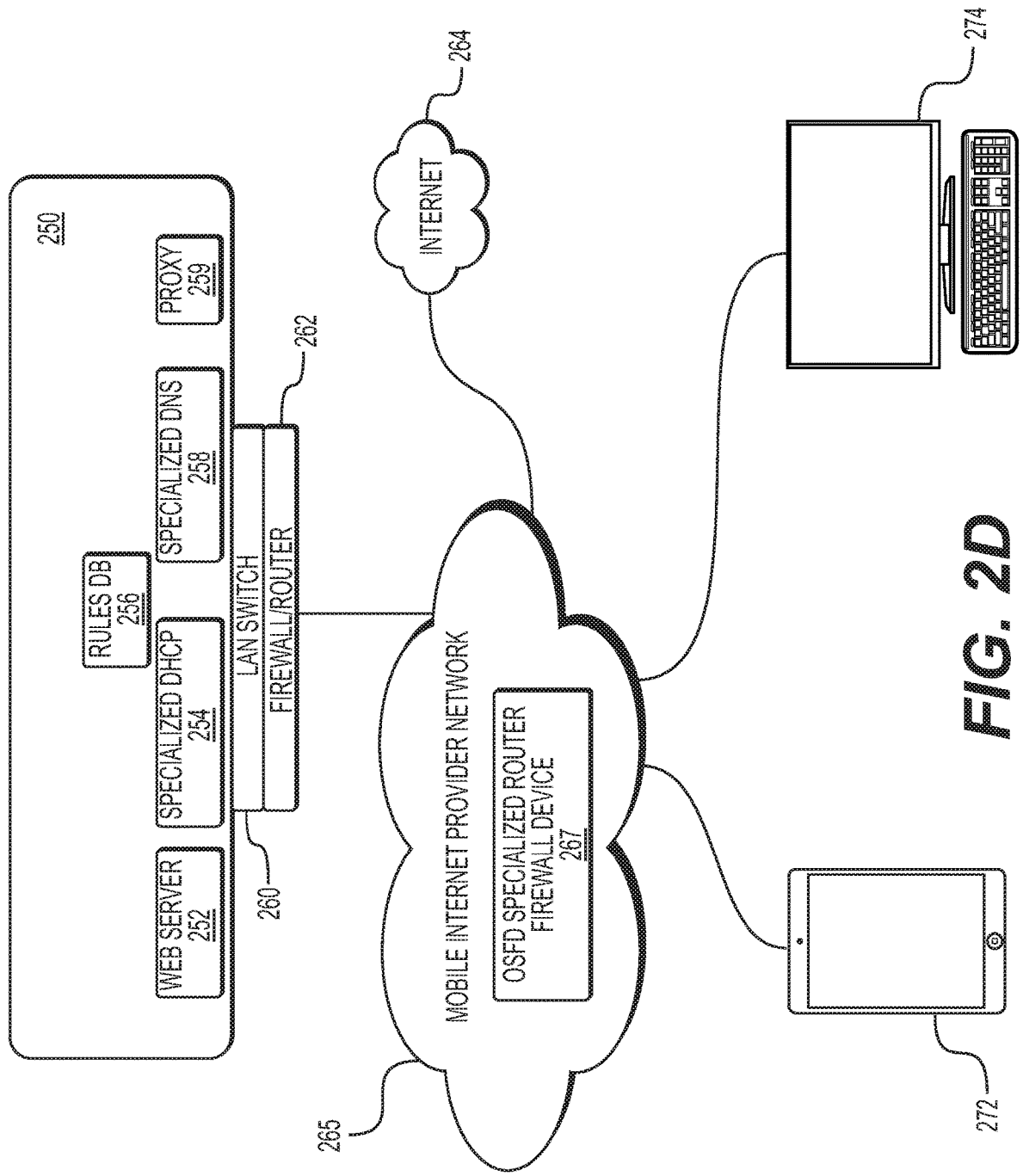
FIG. 2D is a depiction of the network architecture and hardware of an exemplary IACRS system using a mobile internet provider network with an on-site firewall device residing within the mobile internet provider network.

FIG. 2D is similar to FIGS. 2B and 2C in that is shows an IACRS service with an off-site control for controlling individual user access to internet content through user profiling. However, the embodiment shown in FIG. 2D utilizes a mobile internet provider network 265 and houses the specialized router firewall device 267 within the mobile internet provider network 265. In this way, a mobile internet provider can host the client-facing components that might otherwise be on-site and the responsibility of the homeowner or company information technology person. In this embodiment, communications from the network devices 272 are onto the mobile internet provider network 265. The mobile internet provider network 265 is connected to the internet 264. The DNS requests are initially handled by the OSFD specialized router firewall device 267 and mobile internet provider network 265. The mobile internet provider network is connected through a Firewall/router 262 and LAN switch 260 to the off-site control equipment (web server 252, specialized DHCP 254, rules database 256 specialized DNS 258 and proxy 259). A server cluster may be used for the off-site equipment.

Various hardware configurations of servers, computers, network controllers, memory devices and computer parts may be modified to act as an Internet access control and reporting system (IACRS). Computer hardware (e.g., processor and memory) is used for both the off-site device 250 and on-site device 268.

The computing hardware (servers), network components (routers, switches), and base software services (operating systems, relational database, web server) required for an IACRS implementation are commonly available. An exemplary implementation includes IACRS running on a Linux Based server using a Python based Django/Apache/MySQL web server. This implementation works on a single server or on a collection of servers. This configuration supports scaling through the use of memcached and various industry standard approaches.

An alternative implementation could be based on proprietary server technology such as Microsoft. Many of the functions of the IACRS can be located or pushed to a cloud service provider.

Steps in Processes for DNS User Profiling and User Content Access Rules

The operation of the system, off-site and on-site devices, is described below. Whether centralized or not, the IACRS system processes or handles attempts to access the internet by network client devices. A network client device may be any electronic device that is connected to a local area network or inside network whether connected through WiFi, Bluetooth, Ethernet, cellular or other communication method.

When a network client, an electronic device connected to the interior network, attempts to access the Internet, the on-site device will first need to resolve the host name from the URL. To accomplish this task, the network client will send a DNS request to the on-site device. The DNS request will be received by the OSFD because the OSFD has identified itself as including the DNS server during the DHCP session for the network client.

The OSFD will look-up the source (the particular network client device) of the DNS message in the OSFD client map. If the source address is not found, then an authentication of the network client device and individual user will occur. If the source address of the DNS message is found, then certain authentication steps are skipped and authentication information will be sent to the off-site control device.

More particularly, if the source of the DNS message is not found then the following steps are performed to authenticate the user and user's network client device.

1. The DNS Server component of the OSFD will respond to the network client's DNS request with the inside address of the OSFD server.
2. When the client browser sends an HTTP request to the OSFD, the HTTP Proxy component of the OSFD will forward that HTTP request to the off-site control authentication service. This occurs regardless of the HTTP request.
3. If the user presents valid credentials, the off-site device's HTTP service authenticates the user.
4. Upon successful login an authentication token will be returned by the off-site device. In one exemplary embodiment this token will be sent in the HTTP response message as an HTTP cookie (however other mechanisms for sending the token from the authentication sever to the OSFD can be used such as a dedicated TSL socket for example. See https://en.wikipedia.org/wiki/Transport Layer Security (September 2016).
5. Upon successful authentication the OSFD, in one exemplary embodiment, the HTTP Proxy will extract the authentication token and notify the firewall component that the clients client's addresses should be enabled. The firewall component will then enable packet forwarding between the network client and outside network. In most embodiments, only at this step in the process may the network client send any packets to the internet or receive any packets from the internet.
6. In some embodiments, the off-site device maintains a map of authentication tokens to the user's IP address for future look-up.

If on the other hand, the source address of the network client device is found to be on the OSFD authentication map then, in one embodiment, the following steps are taken.
1. A specialized DNS message is created which includes the client's authentication token. In one exemplary embodiment the token maybe added to the end of the standard DNS message although other message formats can also be used.
2. The specialized DNS message is forwarded to the off-site device.
3. The specialized DNS server of the off-site device receives the message and looks-up the original user based on the authentication token.
4. The specialized DNS server of the off-site device will log the requested data and the user for future reports.
5. In some embodiments the specialized DNS server will search and return the cached results if it is has not expired.
6. Otherwise, the specialized DNS server will look up the rules that apply to the specific user. In some embodiments, these rules are stored as access rules.
7. If the access rules allow for the particular user to access the address in the DNS query, then:
a. the off-site specialized DNS server will attempt to resolve the query.
b. If the DNS query can be resolved, the IP address is sent to the OSFD.
c. The OSFD will forward the IP address to the client in the form of a standard DNS message
d. The network client will then have the IP address of the site the user wishes to reach. The network client will then send a data request to that IP address.
8. If the access rules reviewed determine that the client should be denied access, then:
a. the IP address of the off-site control will be sent in the DNS response message.
b. The OSFD will forward the response to the network client.
c. If the client is using a web browser the client will be forwarded to a web page that displays the reason for the failed access attempt.

The OSFD handles outgoing traffic originating from the network client devices. When the OSFD server receives a packet from a network client device wishing to send traffic out onto the internet, OSFD will check to see if the client is authenticated. If the network client is authenticated the specialized firewall component of the OSFD will forward the packet to the outside network. If the network client has not been authenticated, then the specialized firewall component of OSFD will drop the packet. In some embodiments, whether the network client is allowed or not allowed to send packets onto the internet, the system will store in a database (a log) the details of the network client request (e.g., MAC address, date, time, etc.) and the response (e.g., granted, denied, delayed, etc.). This detail is stored for later report generation.

The specialized firewall component OSFD server manages incoming traffic from the internet or outside network to in-network client devices. For example, when the OSFD receives a packet from outside the network, the OFSD will check to see if the client destination is allowed to send and/or receive traffic. In other words, determine if the network client device and user is authenticated. If the receiving device is authenticated, then the specialized firewall component OSFD will forward the packet to the network client device. If the network client is not authorized to receive traffic, the OSFD will drop the packet.

Figure 3:
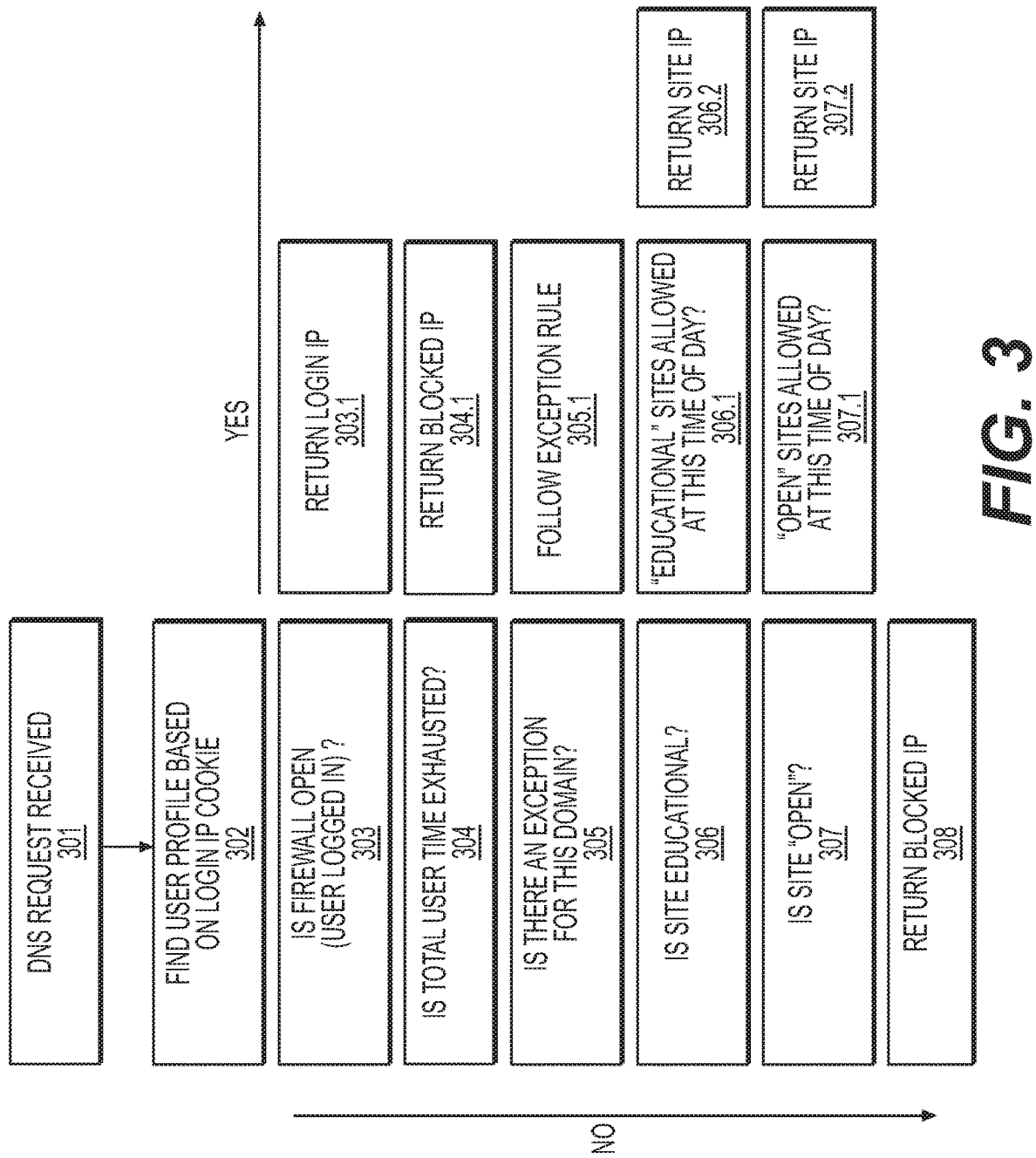
FIG. 3 is a flow diagram for an exemplary method of controlling internet access after a user initiates a request for a web resource.

FIG. 3 is a diagram illustrating one example of the process of a user initiating a request for a web resource using the IACRS. The initiating request originates from an IP device for example from a browser or phone based application.

The steps are as follows:
301.0: A request is received in the form of a DNS request.
302.0: An extra field in the DNS request identifies the user to the system. The user is identified by this ID and the user profile is loaded from the Database.
303.0: Query if the user is logged in.
303.1 If the user is not logged in then the response directs the user to the system login IP.
304.0 Query is elapsed on-line access time exhausted
304.1: If the users total allowed time for that day is exhausted then the response directs to a blocked IP.
305.0: Query if there is an exception for the requested domain.
305.1: If there is an exception rule defined for the requested domain then follow that rule.
306.0: Query if site is educational. Is the site categorized with educational tags?
306.1: Is the site is categorized with tags allowed during Education hours? If yes 306.1 else 307.0
306.1: Are education tags allowed for this user id during this time of day? If yes response is the site IP, 306.2.

307.0: Is the site categorized with tags that allowed during Open hours? If yes 307.1 else 308.0
307.1: Are Open tags allowed for this user id during this time of day? If yes response is the site IP, 307.2.
308.0 Response is a blocked site IP.

In another embodiment, the following is the system and workflow of a centralized IACRS system.

1. One embodiment of an IACRS is comprised of the following components:
    1.1. A centralized IACRS service. The central portion of the IACRS generally provides the following:
        1.1.1. A web server(s) for system control, rule maintenance, and usage reporting.
        1.1.2. A database of users and associated access rules.
        1.1.3. Specialized DNS services tied to customized rules.
    1.2. Exemplary one or more On Site Firewall Device (OSFD) device are located at each site. A site is typically a home, office or other establishment. Each LAN should have one OSFD. Each OSFD server is a small device typically installed by the client. Each OSFD generally implements the following services.
        1.2.1. A specialized DNS Proxy service. i.e. forwarded DNS requests to the IACRS.
        1.2.2. An option DNS cache. This caches requests/response for improved performance.
        1.2.3. A specialized HTTP Proxy service for use forwarding login messages to the IACRS.
        1.2.4. A specialized firewall for blocking and forwarding traffic between in inside and outside interfaces.
        1.2.5. A Specialized Dynamic Host Configuration Protocol (DHCP) service (a network protocol that enables a server to automatically assign an IP address to a computer from a defined range of numbers (i.e., a scope) configured for a given network. DHCP assigns an IP address when a server system is started).
        1.2.6. An Internet content rating database. This database contains a map between Internet domains and content category tags.
2. Preferably, each LAN (Local Area Network) has an OSFD. All computers (including smart phones, tablets, laptops, desktops, wifi thermostats, wifi speakers, wifi tvs, etc.) that are part of the active system are preferably configured to use DHCP. The OSFD has at least 2 physical network ports:
    2.1. Inside network port.
        Used to connect to interior or home network.
    2.2. Outside network port
        Used to connect to the outside (Internet or insecure) segment of the network. This typically connects to the ISP router device (internet router 266).
3. The OSFD will maintain a different network address for the inside and outside networks. For example, the outside network might be 192.168.1.0 and the inside address might be 10.10.1.0. In practice the OSFD is usually a DHCP client for the outside network and a DHCP server on the inside network.
4. The OSFD will act as a DHCP server on the inside network.
5. The OSFI) will maintain a map for IP addresses to MAC addresses.
6. The OSFD will maintain firewall rules between the inside and outside networks. By default, all traffic from the inside to the outside and outside to the inside will be blocked.
7. The OSFI) will maintain a list of which MAC addresses have authenticated against the IACRS central authentication.
8. When a network client attempts to access the Internet it will first need to resolve the host name from the URL. To do this it will send a DNS request.
    8.1. This DNS request will be received by the OSFD. This is because the OSFD has identified itself as the DNS server during the DHCP session.
    8.2. The OSFD will look up the source address of the DNS message in its client map.
        8.2.1. If the source address is not found:
            8.2.1.1. The OSFD authentication map the OSFD DNS server will respond to the DNS request with the inside address of the OSFD server.
            8.2.1.2. When the client browser sends an HTTP request to the OSFD the OSFD will then forward that request to the IACRS authentication service. (This happens regardless of the address.)
            8.2.1.3. If the user presents valid credentials, the IACRS HTTP service then authenticates that user.
            8.2.1.4. Upon successful login an authentication token will be return by the IACRS in an HTTP cookie.
            8.2.1.5. The OSFD HTTP proxy will inspect the packets returning from the IACRS and intercept the authentication cookie.
            8.2.1.6. Upon successful authentication the OSFD will begin forwarding IP traffic between the client and the outside network.
            Up until this point it was not possible for the client to send any IP packets to the Internet or via versa.
            8.2.1.7. The OSFD will preferably maintain a map of authentication tokens to the user's IP address.
        8.2.2. If the source address of the DNS message is found in the OSFD authentication map:
            8.2.2.1. A specialized DNS message will be created which includes the additional information of the client's authentication token.
            8.2.2.2. The specialized DNS message will be forwarded to the IACRS.
            8.2.2.3. The IACRS DNS will receive the message and look up the original user based on the authentication token.
            8.2.2.4. The IACRS DNS server will log the requested data and the user for future reporting.
            8.2.2.5. The IACRS DNS will optionally search, it uses a specific cache for results and return the cached result if it has not expired.
            8.2.2.6. Otherwise the IACRS DNS will look up rules that apply to that specific user. (These rules are described below under access rules.)
            8.2.2.7. If the IACRS DNS rules allow the user to access the address in the DNS query the IACRS DNS will attempt to resolve the query.
                8.2.2.7.1. If the DNS query can be resolved the result will be sent to the OSFD.
                8.2.2.7.2. The specialized DNS component of the OSFD will forward the response to the client.

8.2.2.7.3. The client will then have the IP address of the site it is try to reach. It will then send a data request to that address.

8.2.2.8. If the rules determine that the client should be denied then the address of the IACRS will be sent in the DNS response message.

8.2.2.8.1. The OSFD will forward the response to the client.

8.2.2.8.2. If the client is using a web browser the client will be forward to a web page that displays the reason for their failed access attempt.

8.3. When the OSFD server receives a packet from a client it will check if that client is allowed to send traffic (i.e. the client has authenticated)

8.3.1. If the client is authenticated and it will forward the packet to the outside network.

8.3.2. If the client is not authenticated it will drop the packet 8.3.3. In either case above, the details of the request and the response will be stored in a database for reporting purposes.

8.4. When the OSFD server receives a packet from the outside network it will check if the client destination is allowed to send traffic (i.e. the client has been authenticated).

8.4.1. If the client is authenticated and it will forward the packet to the client network.

8.4.2. If the client is not authenticated the specialized firewall component of the OSFD will drop the packet.

In other embodiments, certain types or categories of websites are typically or always allowed or passed through to the requesting network device. For example, websites that are related to or needed for a workforce, such as a project management website or a company proprietary website, is always resolved favorably and the IP address is passed onto the network device. A community center may allow access to its own website without applying any user profiles or access rules. The needed websites (e.g., for work or the community center) are categorized as acceptable and the IP address favorably resolved and communicated. In the home or family context, in some embodiments, educational websites may be considered needed websites and always allowed.

Educations IACRS Education Tasks

IACRS Educational Tasks are defined tasks. The tasks may be defined for example, by the parent, guardian, supervisor, overseer or by a site curator. Each task can contain a description, a URL, an image, and hints.

Educations Tasks are assigned to user (e.g., children, employee, patient, etc.) by the parent or guardian either as a one-time event or as a recurring responsibility on specific days of the week.

To complete an Educational Task, for example, the child must study the online content in the URL and then write a report detailing what was learned.

In some embodiments, once complete the parent receives a notification and the task will show as complete on the status page.

The child must complete the task to have Open Internet access. If the child does not complete the task internet access is limited to the Educational Hours categories.

Educational Tasks can also be used as requirements for other incentives such as behavior based purchasing.

Figure 4:
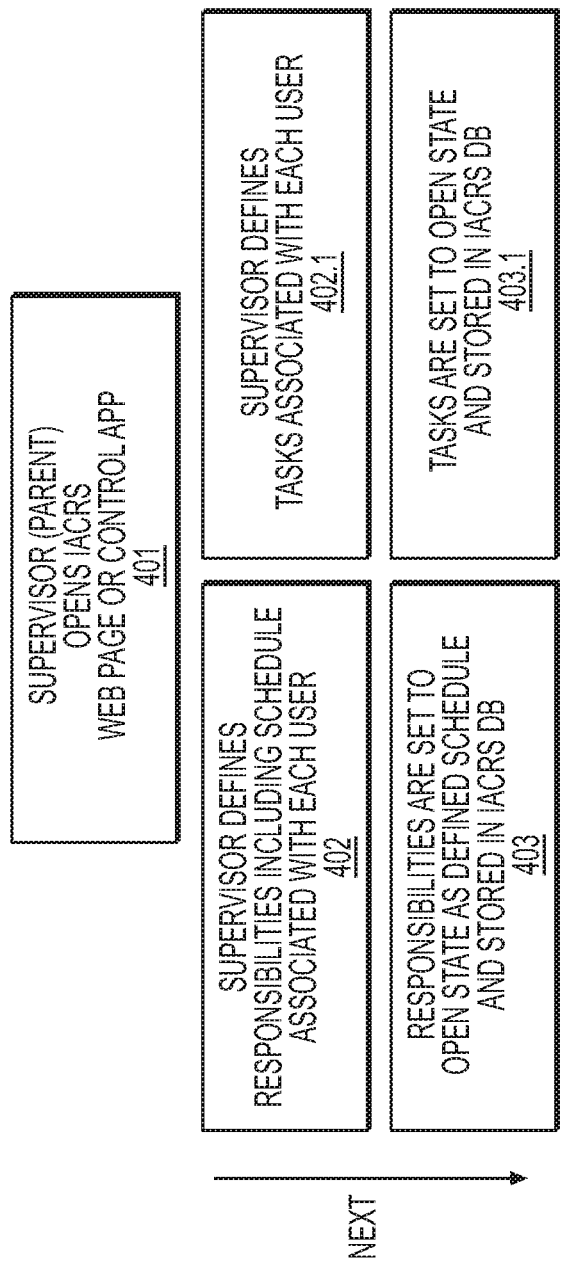
FIG. 4 is a flow diagram showing an exemplary process for behavior based rule creation for use with an IACRS.
Figure 5:
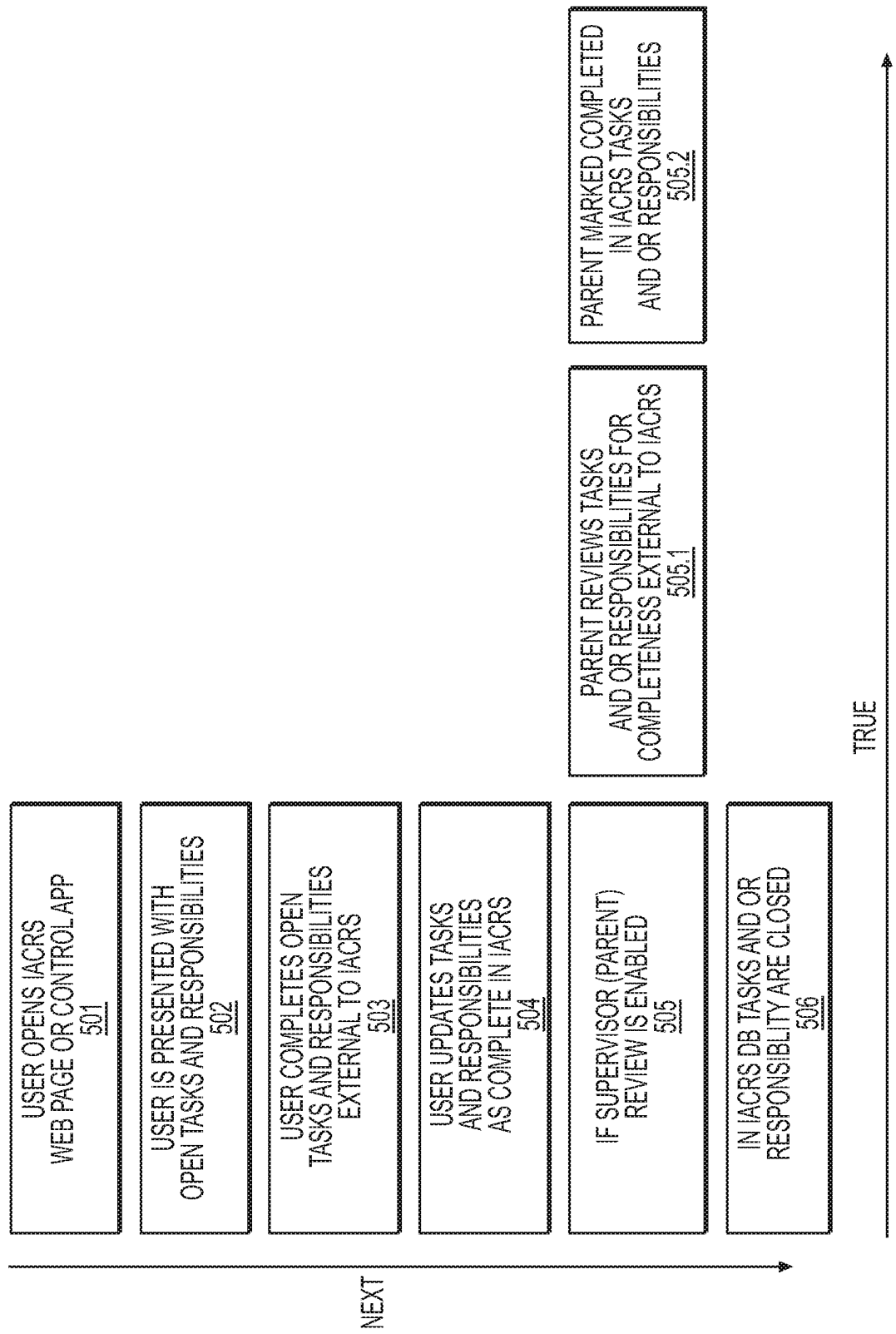
FIG. 5 is a flow diagram of the exemplary steps for user and supervisor to complete or close tasks and/or responsibilities.

FIG. 4 shows the flow or process for IACRS behavior based rule creating. The example shown is a task based system. Each user is assigned responsibilities and/or tasks to complete on a schedule. Five steps in the process are shown in FIG. 4.

In the first step, a supervisor (e.g., parent, guardian, administrator, etc.) opens IACRS web pages or control application 401.

Following, the Supervisor defines responsibilities including a schedule associated with each user 402.

Afterwards, the supervisor defines tasks associated with each user 403.

Following input by the supervisor of responsibilities, responsibilities are set to OPEN state as defined schedule and stored in IACRS Database 404.

Tasks are set to OPEN state and stored in an IACRS database 405. The screen shots included provide a visual for how this process occurs from the standpoint of the user interface.

Access Rules Including Behavior Based Rules

Behavior Based Rules

Behavior Based Rules is an element of the IACRS for providing access to Internet content based on the behavior of the user. For example, parents do not want their children to play computers games before they have completed their homework and cleaned their rooms. A behavior based filter would filter all Internet access for that child (except potentially educational and search sites that might be required for homework) until, for example, the homework is complete and the room is clean. At such a point the filter would open up access for that single child to Internet games or other safe content. Simultaneously, other children in the household may still be blocked.

Also, the IACRS includes a subsystem for Educational Tasks. This subsystem rewards the user (for example a child) with greater Internet access or more Internet time for completing tasks. These tasks, for example, may require the user or child to watch a video or study the information on a site and then complete a questionnaire, form or write a report. The user or child's progress and the completed work is tracked within the IACRS. Once the assigned tasks are complete the user or child may access other material not related to the task (for example non-educational content).

One implementation of the IACRS includes a rules database. In some embodiments, the rules database maps users to content access permissions.

The permissions can be based one factor or upon a combinations of factors such as:

The users access level (e.g., does the user have elevated access, mid-level access or a lower level access rights);

Time of day;

Day of week;

Type of Content (e.g., educational, news, music, games, pornography, etc.);

Accumulated Internet usage during the day(s);

Completion of IACRS Educational Tasks;

Other extraneous events (e.g., did the user complete a certain task) (See for example tasks from FIG. 4 above); and Any other condition related to a user.

When the IACRS receives a DNS request it first checks that request against the rules database. If the rules assigned to that user permit access, then the request is resolved normally (i.e. the IP address of the requested content is returned). If the rules assigned to that user block access, then the request is resolved with IP address of the IACRS so that the user sees an explanation for the blocked request.

Additionally, the IACRS maintains and tracks Behavior Based Rules. Such rules are specific to the user and can include for example, responsibilities (e.g., recurring tasks such as homework, chores), tasks (e.g., one time tasks defined by the parent), or curated educational tasks. The IACRS database maintains these rules and the behavior of each user or child. When a content request is received by the IACRS these rules determine if the request will be rejected or accepted.

Any combination of rules can be used to control access. One of the unique aspect of IACRS is that Internet access and content are being filtered based on actual users, a particular user or group of users (e.g., not generically all users) and this is being accomplished without creating a proxy for all content.

To be clear, in many embodiments, the only content that is passed through the OSFD HTTP Proxy is the IACRS login prompt and reply. By avoiding the use of HTTP Proxy for all but authentication, the system achieves a much higher level of performance while maintaining a high degree of functionality (e.g., user based rules).

Pass Through IP Device Rules

There are many types of IP devices that in many embodiments co-exist on the network. These include Internet of Things, WiFi thermostats, music streaming devices, security and surveillance systems, etc. There is no benefit for these devices to sign on to a content filter and often no way to do so.

In such cases the IACRS database can store a list of MAC address for each client site. This MAC address list will be passed to the OSFD server during initialization and updated as needed. The OSFD can then permit all traffic to and from each of these IP devices. In other words, these IP devices will be treated as "pass-through" IP device and may be pre-approved or authorized for the level of access needed to operate the device. In some embodiments, the MAC list is created, stored and then updated as needed.

User Behavior Impacting Rules

This diagram shows a user completing tasks and/or responsibilities assigned on the IACRS. Various activities can be assigned to a user. Some examples are finishing homework, preparing for test, taking out the trash, taking out the recyclables, walking the dog, cleaning the cat litter, washing the car, getting up in the morning, etc.

To begin, a user opens an IACRS web page(s) or control application 501. This can be accomplished through the user interface for IACRS. The user may step through the home page to reach a desired webpage.

The user is presented with OPEN tasks and/or responsibilities 502. The OPEN tasks and/or responsibilities are displayed on the screen of the user's device. In some embodiments this appears as an activities completed today web page with boxes for checking when an activity is complete.

The user completes OPEN tasks and responsibilities 503. In most embodiments, the tasks and responsibilities are external to IACRS 503.

The user updates tasks and/or responsibilities (marking as appropriate) as complete in IACRS through the IACRS user interface 504.

If supervisor (e.g., parent) review is enabled in the system, then review is now available 504.

A parent reviews tasks and or responsibilities for completeness external to IACRS. In other words, someone checks to determine whether tasks and/or responsibilities are actually completed 505.

Parent marks as completed in the system the IACRS tasks and/or responsibilities using the IACRS interface 505.2.

Once marked completed in the IACRS database, tasks and/or responsibilities are CLOSED in the system 506.

Behavior Based Rule Enforcement

Figure 6:
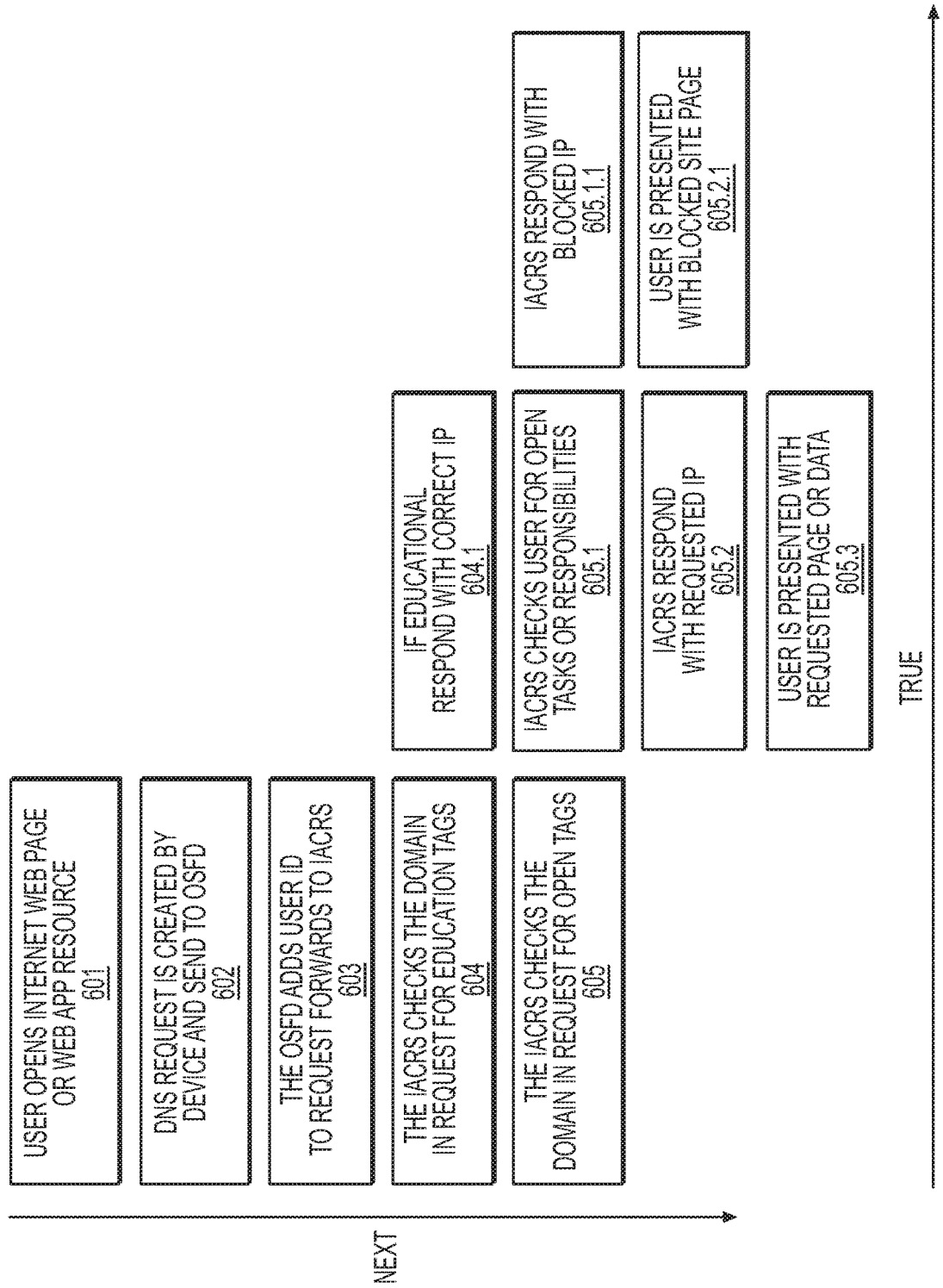
FIG. 6 is a flow diagram of exemplary steps for behavior based access control and/or enforcement of rules.

FIG. 6 shows an example of use of the IACRS system for behavior based rule enforcement. The user is given access or denied access to a requested web resource based upon rules applied. These rules can be individualized or group rules. Completion of educational items, tasks or responsibilities can be determinative of whether the user will gain access to the requested web page. Following is the workflow example as depicted in FIG. 6.

User opens Internet web page or web application resource 601.

DNS request is created by the user device and sent to OSFD 602.

The OSFD adds user ID to request and forwards to IACRS. 603.

The IACRS checks the domain in the request for education tags 604.

If the domain is educational IACRS responds with correct IP 604.1.

The IACRS checks the domain in request for open tags 605.

IACRS checks user for Open tasks or responsibilities 605.1.

If there are open tasks or responsibilities, IACRS responds with blocked IP 605.1.1.

If there are no open tasks or responsibilities, IACRS respond with requested IP 605.2.

User is presented with blocked site page 605.2.1.

User is presented with requested page or data 605.3.

Behavior Based Purchasing

A subsystem or feature of the IACRS relates to allowing purchases as an incentive for positive behavior from users. For example, in the home environment, parents may enter behavior based rules into the IACRS system. The parents and the children use the IACRS to track behavior targets (e.g., get homework done, clean room, complete educational task, take out garbage, get good grades, don't fight with siblings, etc.). In other environments, the behavioral targets may be different such as completing volunteer work, returning books to a library, completing evaluations or reviews, completing camp counseling work, meeting with the psychologist, attending group rehab session, applying for a job, etc.

A profitable business model of marketing real goods, software, content and/or services as an incentive for good behavior is available using the system. For example, a parent and child can agree that if a child completes his homework every day for a month then the child can get a new pair of basketball shoes, collectible items, a toy, an electronic game, music, etc. The user can then select the shoes from online merchants that partner with the IACRS company or provider. Throughout the month both the parent and the child can track the child's progress on the IACRS and if the child achieves his goal then the shoes are automatically purchased and shipped. The IACRS company would receive a commission from the vendor (or could sell some items directly).

The same concept could be applied to "soft" goods like video games which could be digitally delivered and directly integrated into the system.

In another example, in a prison, halfway house or residential treatment facility for addictions, points can be earned towards privileges for example streaming video, time outside, television time, or other items.

In a behavior based purchasing subsystem, the IACRS tracks a user's behavior, such as a child's behavior. In some embodiments this tracking includes responsibilities, tasks, hours, time on-line, queries to access individual and categories of websites, etc. The behavior based purchasing subsystem allows a parent to create material incentives for positive behavior. These incentives can be real or soft goods (e.g., video games, music, applications, etc.).

The workflow for this behavior based incentive subsystem is primarily a data and rules driven workflow. For example:

1. The child is defined within the IACRS in the normal manner.
2. The IACRS service provider would enter into commercial service relationships with 3rd party vendors of products. This agreement would allow the IACRS to authorize orders on behalf of mutual clients. In exchange for this service the 3rd party vendor will pay a fee to the IACRS vendor, a commission.
3. The parent would have an account with 3rd party product vendors website in the normal manner.
4. The parent would enter the 3rd party vendor credentials into the IACRS database.
5. Responsibilities and tasks for the child are defied in the IACRS in the normal manner.
6. The parent defines a Behavior Based Purchase (BBP) rule. The BBP rule is defined using the IACRS user interface (e.g., GUI) and stored within the IACRS database. The BBP rule(s) can combine one or more of the following elements:
    6.1. Target Time Period (absolute date or relative)
    6.2. Number of Tasks to complete
    6.3. Number of Educational Tasks to complete
    6.4. Number of days to complete all responsibilities
    6.5. Max Number of hours online
    6.6. Max time on specific categories of web sites (i.e. no more than 10 hours of gaming in period)
7. Also the BBP rule will contain a reference to a product. The parent may select the product through the IACRS interface or by using a separate user interfaces and entering the reference data to IACRS. The product reference may contain:
    7.1. Vendor Product Reference ID
    7.2. Product Definition
    7.3. Unit Price
    7.4. Quantity
    7.5. Shipping Charges
    7.6. Total Cost
8. The parent would confirm the product information.
9. During the target time period the child is presented with an image and description of the product, a description of the BBP rules, and a synopsis of their performance of the rules on their IACRS portal page.
10. At the end of the target time period the IACRS tests the defined BBP rule against the behavior data stored in the IACRS database. If the tests are positive, then both parent and child IACRS pages display the BBP rules as being
11. The parent may accept/confirm the BBP completion and confirm the purchase. This will trigger a message to the specified vendor authorizing the purchase.

Using the same or similar workflow, incentive based purchasing can be implemented for any unit or organization using the IACRS system.

Figure 7:
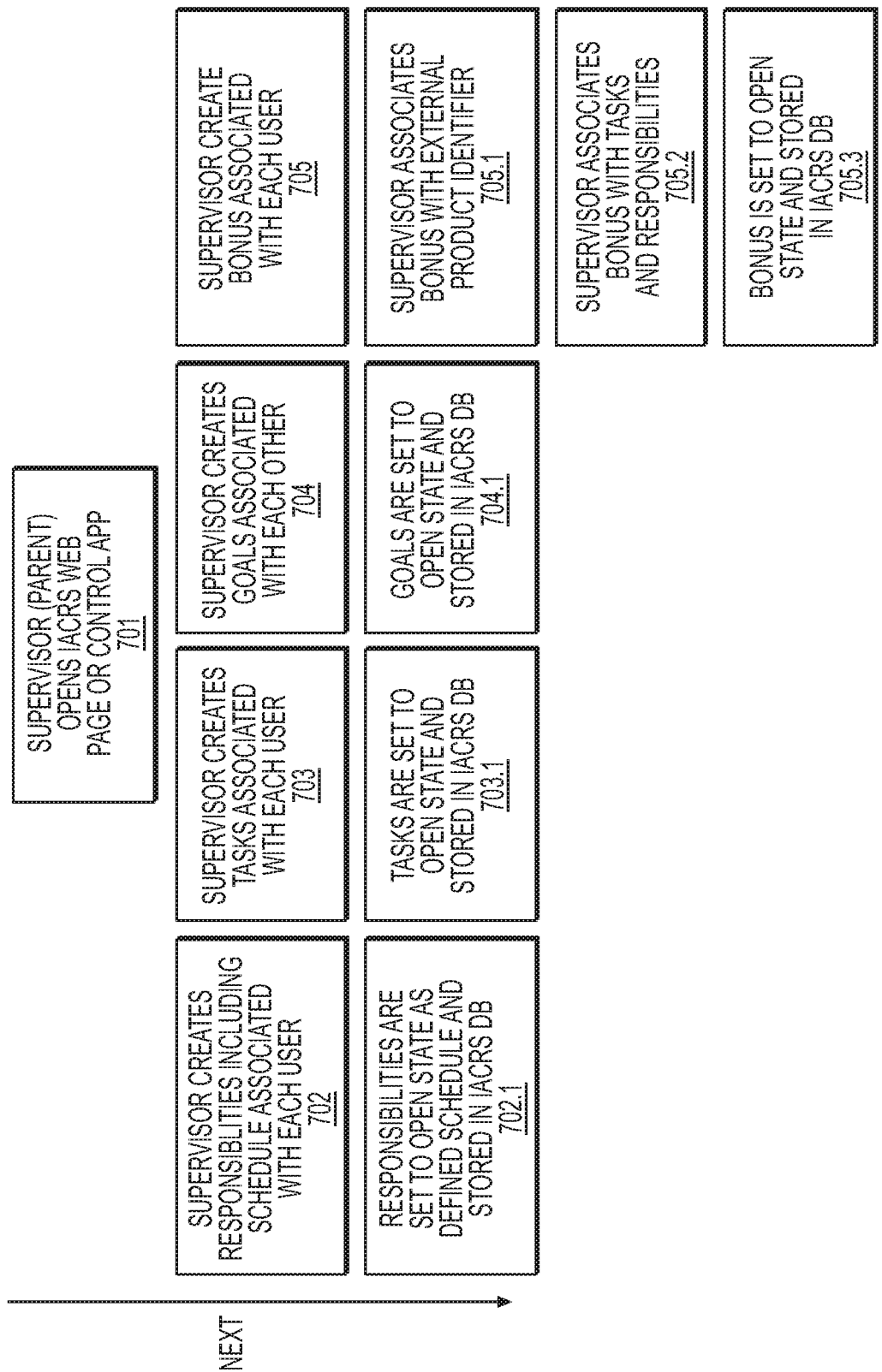
FIG. 7 is a flow diagram showing an exemplary process for a supervisor initiating behavior based purchasing.

FIG. 7 shows one embodiment of how a supervisor may initiate behavior based purchasing in an exemplary IACRS. More particularly, FIG. 7 shows the steps or method for initiating the system to set-up or establish behavior based purchasing. In summary, the system provides an administrator, organizer, supervisor or the like, the ability to establish responsibilities, tasks and/or goals for one or more users. Further, the system allows for the creation of bonuses if responsibilities, tasks, and/or goals are met by the user.

Referring to FIG. 7, the first step is in the process is the organizer such as a supervisor (parent) opens the IACRS web pages or IACRS control application to begin the process 701. An initial screen or set of screens is presented to the supervisor to get to the appropriate IACRS page.

The supervisor using the IACRS system interface creates responsibilities including a schedule associated with each user or groups of users to whom purchasing will be made available through completion of responsibilities 702.

The system then sets those established responsibilities to the OPEN state in the defined schedule and store the state in IACRS Database 702.1. The schedule and details of the responsibilities are also stored in the system.

Optionally, the supervisor creates tasks associated with each user 703. For each user, that the supervisor wishes to participate in the tasks portion of the behavior based purchasing, tasks are established to be completed. This task information is then stored by the IACRS system.

The tasks that are established are then set to OPEN state and stored in IACRS Database 703.1.

Optionally, the supervisor creates goals associated with each user 704. This allows for goal oriented behavior purchasing.

The created goals are set to OPEN state and stored in IACRS DB by the system 704.1.

Typically, following the establishment of responsibilities, tasks, and/or goals, the supervisor creates one or more bonuses associated with user in the behavior based purchasing system 705.

The supervisor may then associate bonuses with tasks and/or responsibilities 705.2.

The Supervisor may then associate bonuses with one or more external product identifiers 705.1.

The system then sets the bonus or bonuses to an OPEN state and store the information in IACRS Database 705.3

While several chronologies or orders of processing steps for initiating behavior based purchasing are described with reference to FIG. 7, the steps may be performed in various orders.

Figure 8:
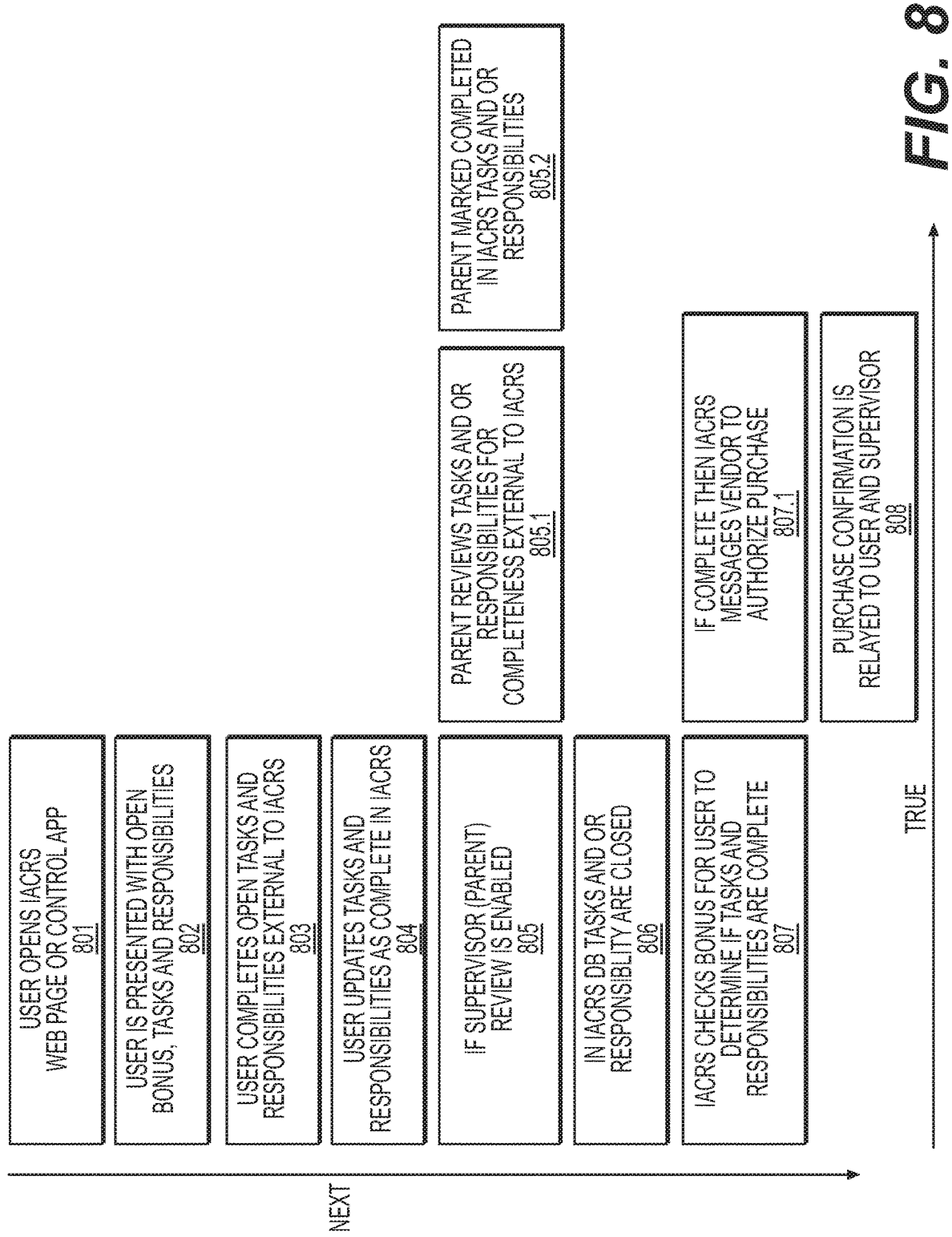
FIG. 8 is a flow diagram showing an exemplary process for a user of the system to complete behavior to purchase products or services.

Referring to FIG. 8, an example of the flow or process from behavior to purchase is described. The steps shown in FIG. 8 generally begin with the user completing assigned responsibilities, tasks or goals, proceeds to parent review and then product purchase. In this way, a user can be rewarded with a purchase for completing assigned responsibilities, tasks and/or goals.

The user opens an IACRS web page or control application to begin the process 801. In many embodiments, the user will begin on a home page and navigate to the web pages related to behavior.

After entering the system, the user is presented with OPEN Bonus, tasks, and responsibilities 802. In this manner, the user can see what tasks and/or responsibilities are available for completion and what bonus are available to be earned.

The user may proceed to complete any OPEN tasks and OPEN responsibilities 803. While some user tasks and responsibilities may be internal to IACRS (e.g., completing information forms, registrations forms, product registrations, etc.) generally, the user tasks and responsibilities are external to IACRS 803.

When appropriate, a user updates the status of tasks and responsibilities as complete in IACRS 804. In some embodiments, the status change is noted by the user on a webpage dedicated to noting completion of tasks, responsibilities and/or goals.

If supervisor (parent) review is enabled in the system then additional screens and steps are made available to the reviewer 805.

The supervisor may review tasks and or responsibilities for completeness external to IACRS 805.1.

On an available screen, supervisors mark completed in the IACRS particular tasks and/or responsibilities 806.1.

Following either user or supervisor marking responsibilities and/or tasks as completed, the state of those are changed in the IACRS Database 806. More specifically, the completed tasks and/or responsibility are marked as CLOSED 806.

The IACRS checks bonus available for the user to determine if sufficient tasks and/or responsibilities are completed for the user to qualify for a bonus 807.

If the criteria for a bonus are complete then IACRS messages a vendor to authorize purchase 807.1. In some embodiments, the user is messaged and given authority to make a product purchase.

After purchase, a purchase confirmation is relayed to the user and/or the supervisor 808. In some embodiments, invoices are sent to either or both the user and the supervisor.

Reports and Report Generation

The IACRS service receives all DNS requests from clients with a tag identifying the client user. This allows the DNS server to store the request and response details in a database for future reporting. This is valuable because the database contains the actual user-level detailed information on requests for website content, access to on-line content, time on-line and denial or blocked access. Various reports can be generated using an IACRS including those specific to individual users and groups of users. Detailed logs and/or various charts and graphics are used in embodiments to display the reports. Supervisors can customize reports about individuals and for groups of individuals. See report examples attached as screenshots shown in FIGS. 11, 12 and 13.

Screenshot Examples

FIGS. 9 through 27 are exemplary screen shots of various embodiments of the IACRS. The screen shots depict various features, subsystems and capabilities of the IACRS system. Any combination of these features, subsystem or pages may be assembled for an IACRS system. The screenshots depict various implementations of the IACRS as well as various user interfaces. Many of the screenshots are implementations of the features, systems and methods described with reference to FIGS. 1 through 8. The screenshots are each individually described below.

FIG. 9 is an example of a main page or home page for a supervisor to review status of users and make control changes. The page shows the supervisors login name, IP address, and the current date and time. From this page the supervisor can access for each user detailed reports, settings, rules, time, block, responsibilities and tasks. The page informs the supervisor of a user's status such as currently on-line, "Online Now." It also informs as to whether the particular user is allowed on educational sites and whether the user's status is open allowed for general websites. This main page also informs for each user of time online, last activity accepted and denied access of websites. Responsibilities and tasks are listed for each user and the status of such responsibility or task as completed, not completed in progress or the like. Any links associated with the tasks are also shown. This page allows a supervisor to obtain an overview of the users and status of users and make changes or adjustments. Goals may also be listed on this supervisory main page.

FIG. 10 is an example of a supervisor page for an individual user and allows the supervisor to set internet access rules for the individual user. The user may be granted rights to mark responsibilities, tasks and goals as complete. The number of hours allowed on the internet per day or other time period may be adjusted on this type of supervisory page. The settings allow the supervisor to indicate which categories or types of website a user may access prior to competing assigned responsibilities. In this way content viewed can be controlled by the supervisor. For example, educational websites may be accessible at any time, even before responsibilities are complete. The same exemplary page allows access to certain types of content after responsibilities are completed. The same control by content type may be used for tasks and goals, before and after completion. Certain types of content such as hacking, adult, guns, pornography, drugs, and hate may be restricted and never made available to certain users.

Figure 11:
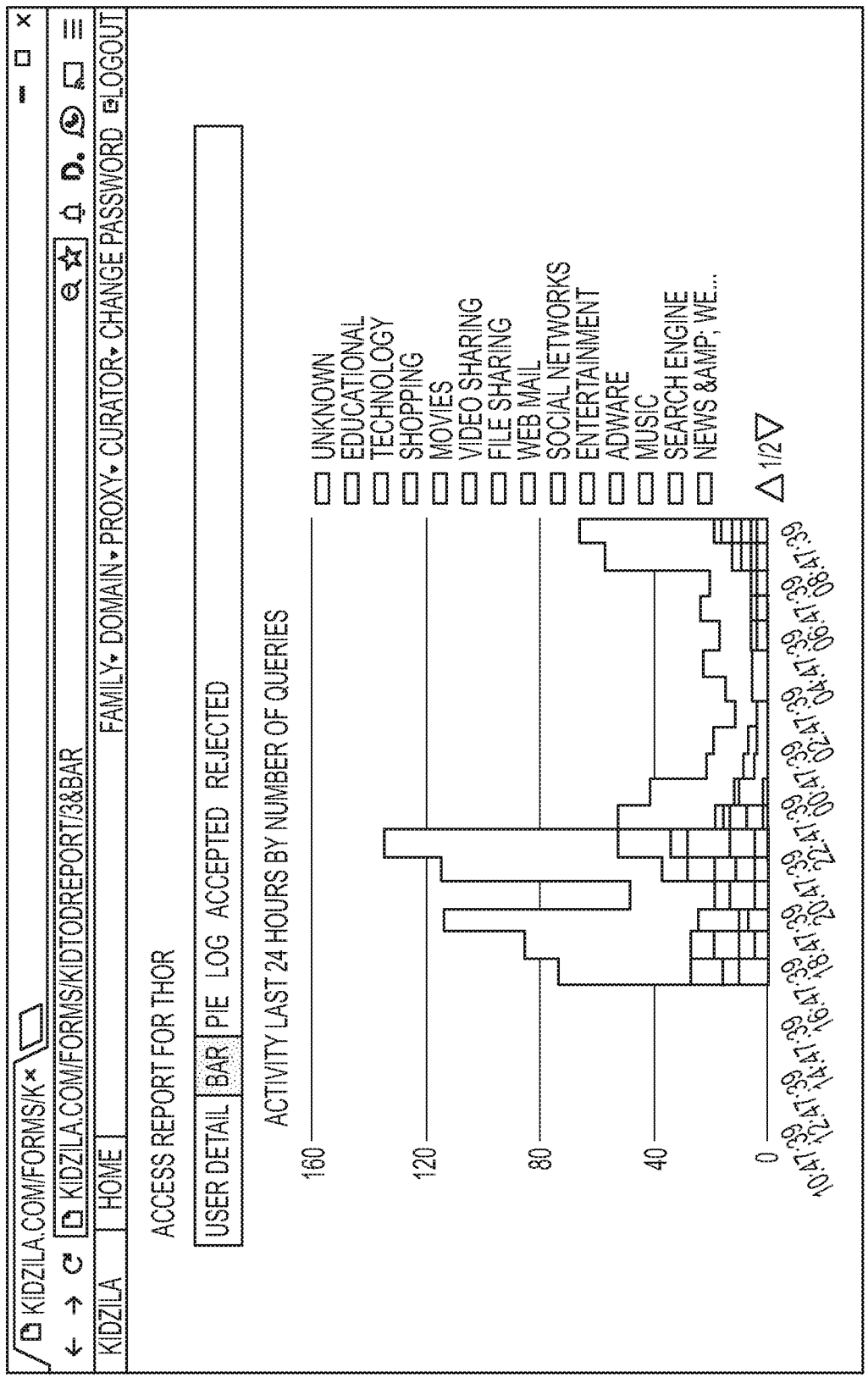
FIG. 11 is an exemplary screenshot of a page displaying a graphical report in a bar chart type format showing user access by time of day and category.

FIG. 11 is an example of an access report for a user. In particular, this is a graphical bar chart type report of the content accessed by a user Thor through the Internet. More specifically, this particular chart shows the number of queries (content requested) during a 24-hour period by category of content. A bar chart is well suited to display the type of content by time of day. Using the system, various detailed reports of Internet queries, accessed or content viewed may be generated. Different colors may be used to show the different content. The types of charts and the data arranged on the x and y axis, as well as the content categories may be changed. The options bar shown allows choices for report information such as detail, bar, pie, log, accepted and rejected.

Figure 12:
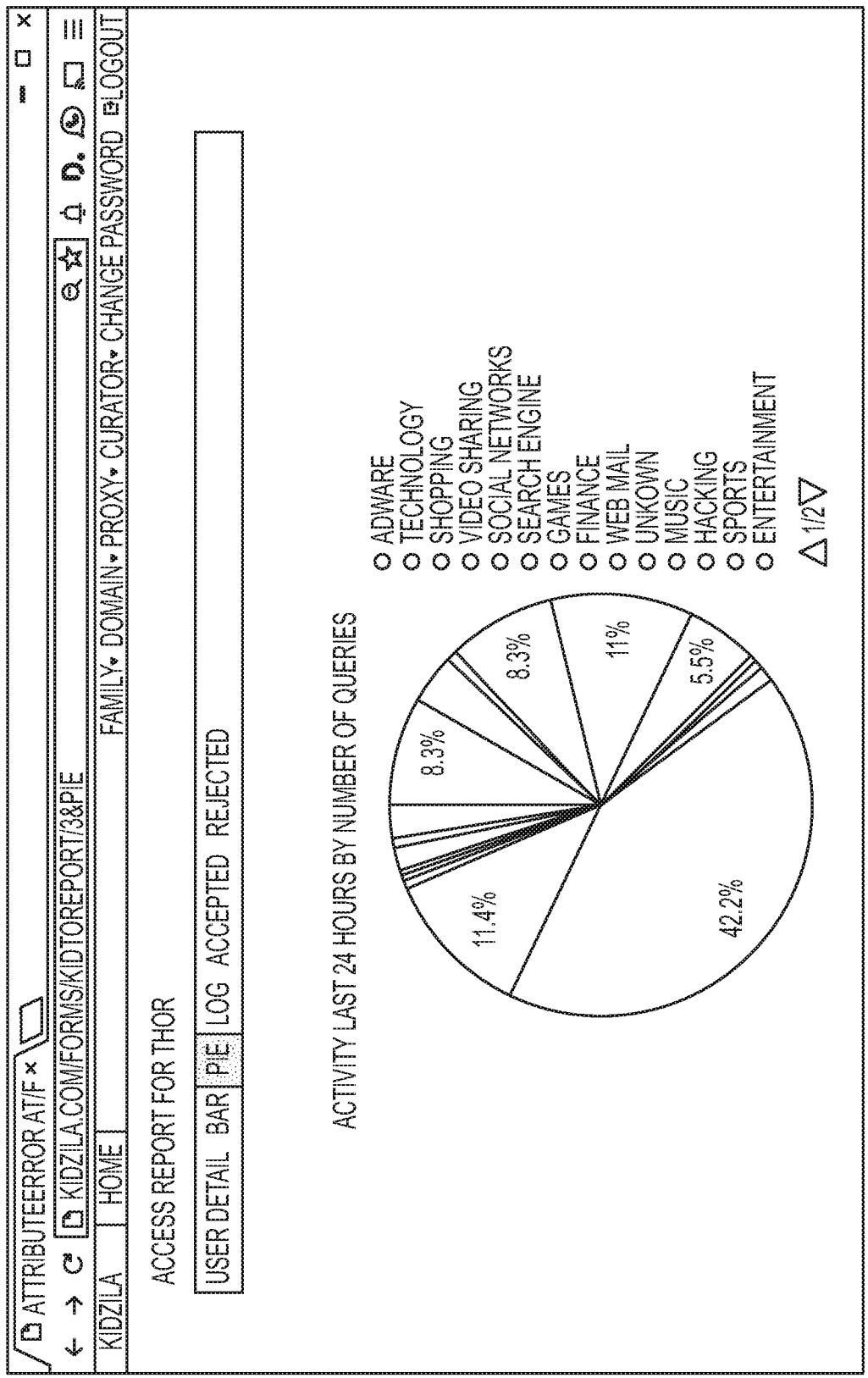
FIG. 12 is an exemplary screenshot of a page displaying a report by user showing a pie chart of 24-hour user activity by category.

FIG. 12 is a similar page to FIG. 11, but provides a pie chart graph of the activity in the last 24-hours by number of queries and type of content. Various other embodiments, formats or types of charts are available for displaying access report date by queries made or access granted or otherwise. The pie chart allows for an ease of viewing the percentage of the type of content queried or accessed. Allows a supervisor a quick snapshot or view of primary content categories for a user.

Figure 13:
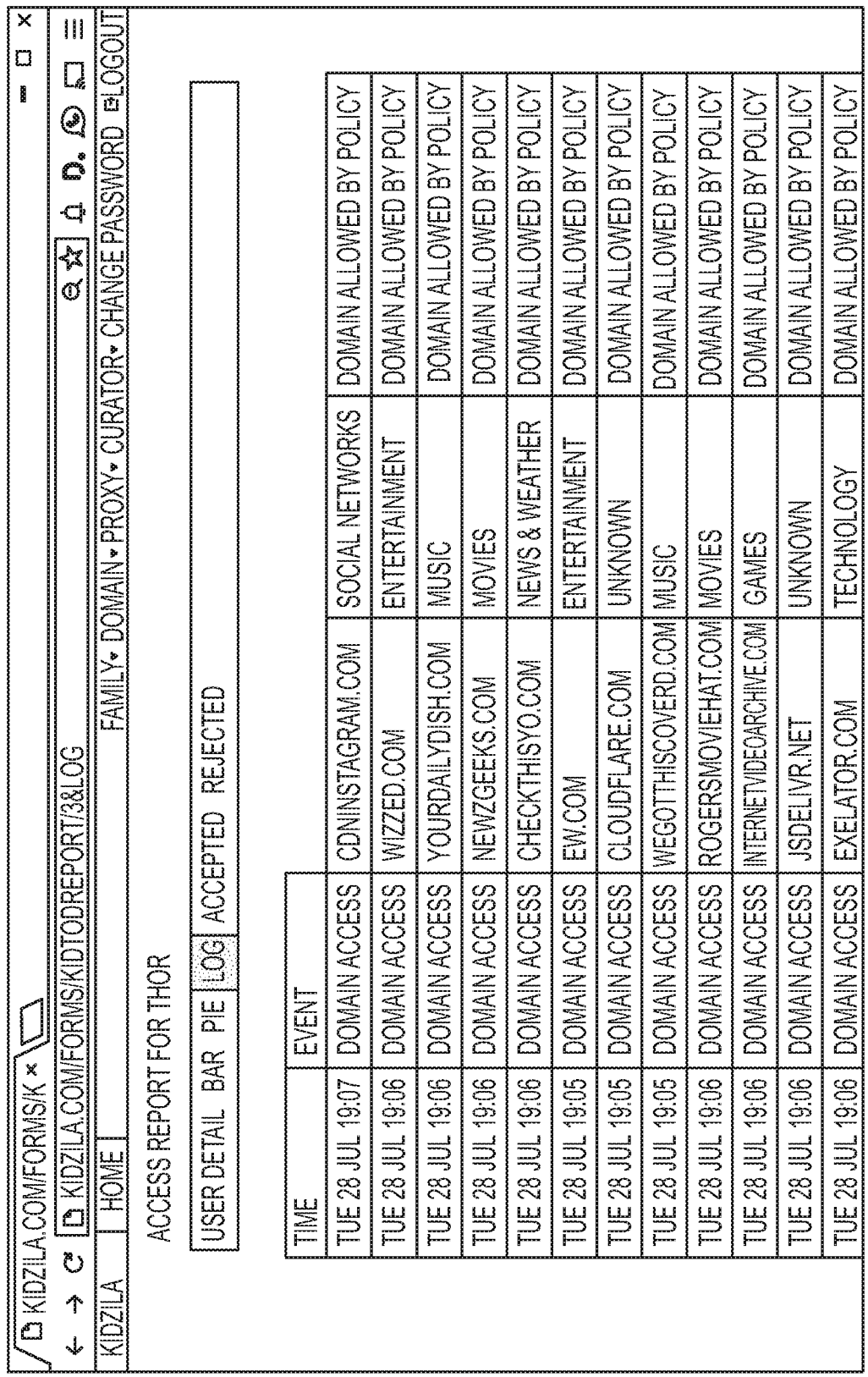
FIG. 13 is an exemplary screenshot of a page displaying a user report showing specific site access requests for a user with category information and information on whether or not the requests were granted.

FIG. 13 is an example of a log for a query by query report for a user. This is a detailed report for queries and/or accessed domains. This individual user report lists date and time of day for each query, the domain name, the domain type and whether access was granted or denied and why. In some embodiments, groups of users may be aggregated for the reports such as those shown in FIGS. 12 and 13. Exemplary categories of content are shown on the page including social network, entertainment, music, movies, news & weather, music, games, technology, and unknown.

FIG. 14 is an example of a local site set-up page for an administrator. In particular, this page is a set-up page for a family. From this type of page users can be added and removed and various personal information (e.g., phone, address, zip, building location, time zone, type of employee, etc.) can be entered. Login names as well as actual names may be entered. Different types of users may exist in the system. In some embodiments, adults and children are user types. In other embodiments, other user types are available, for example, type of employee, level of access and/or security clearance of employee, etc.

Figure 15:
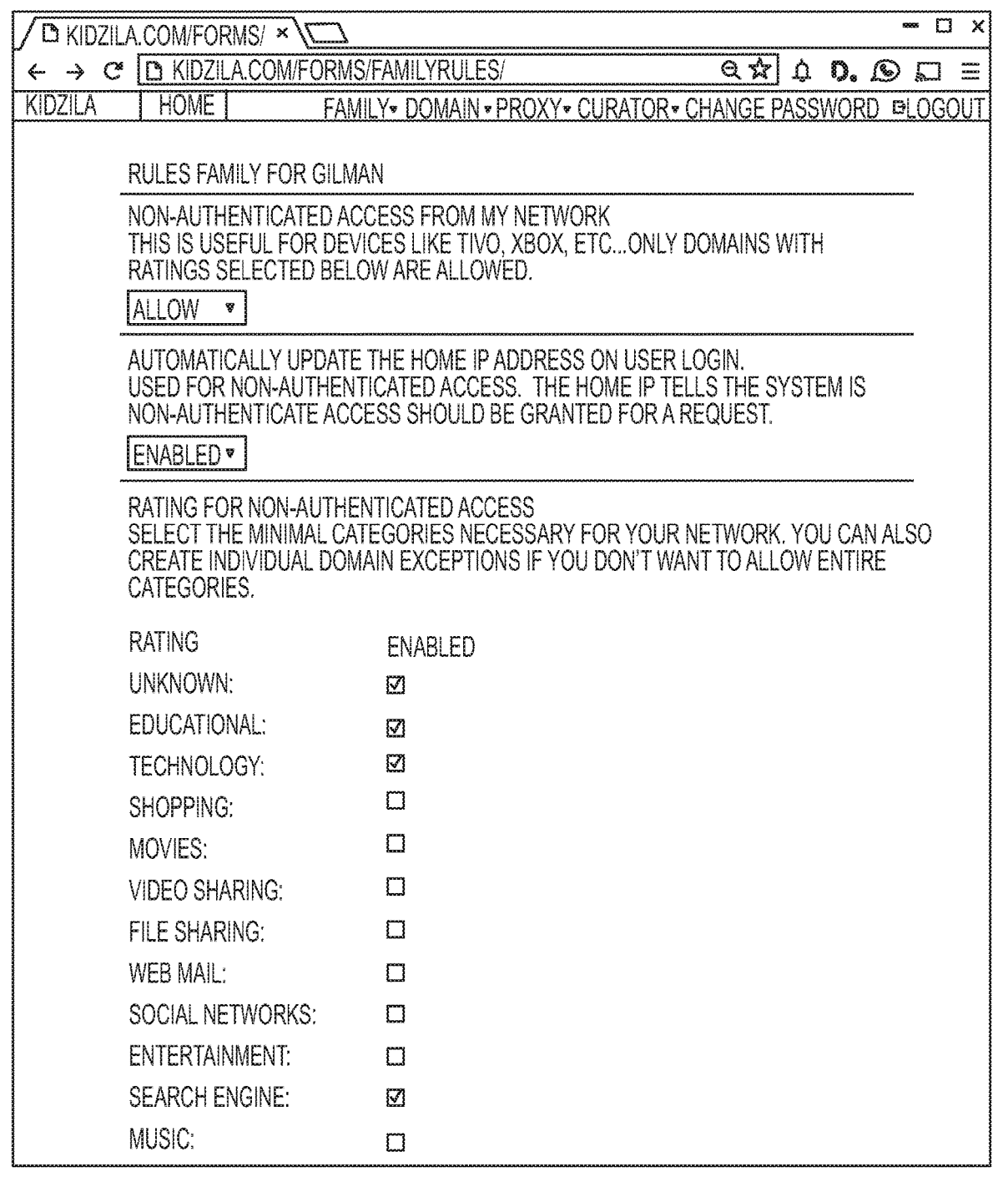

FIG. 15 is an example of a page for an organization or family using the system to establish rules for the local area network or site. Certain rules apply to the whole inside network regardless of individual user access. For example, access to the Internet by non-authenticated devices (e.g., thermostats, lights, security system, surveillance systems, entryway doorbell systems, Internet TV systems, Tivo, gaming systems, Xbox, refrigerators, hot water heaters, etc.) would be governed by non-user specific rules. For these devices home IP address can be automatically updated. In some embodiments, non-authenticated access rules are governed by one set of rules. In other embodiments, each individual non-authenticated device is assigned individual rules of access.

FIG. 16 an exemplary page for a curator to check on the status, create and to manage user tasks. A curator can administer the tasks for an organization or family from this entry page. Information such as date tasks were created, status, appropriate ages, descriptions and relevant links are all organized on the task curator page. The tasks may be filtered or searched using various techniques and soft buttons available on the page. New tasks can be created and properly encoded for storage and display by the system. Existing tasks may be modified or deleted using the modification column.

FIG. 17 is an exemplary page for use by a curator to rate websites and other available content and manage those ratings. In some embodiments, the ratings are simply placing the content into type categories defining the genre of the content (e.g., search engine, social network, web mail, news & weather, educational, video sharing, file sharing, shopping, television, movies, sports, music, technology, adware, games, entertainment, finance, health, government, politics, time wasting, dating sites, hacking, gambling, adult, guns, pornography, drugs, hate, foreign propaganda, unknown, etc.). In other embodiments, the content is also rated in terms of quality (e.g., 1 to 5 stars), age appropriateness or other rating scales such as television rating scale (General audience, TV14, TVMA, etc.), movie rating scales (G, PG, PG17, R, X, etc.) or other proprietary rating scale. In yet other embodiments, genre and ratings are provided by an outside party or are self-generated by the system in the first instance. These rating allow supervisors to control access to content by rating. In other words, the supervisor can block all or some users from content rated as mature audience, adult, gambling, pornography, drugs, hate, etc. In sum, the ratings provide a tool for the supervisor to block access to content on an individual, group or network basis.

Figure 18:
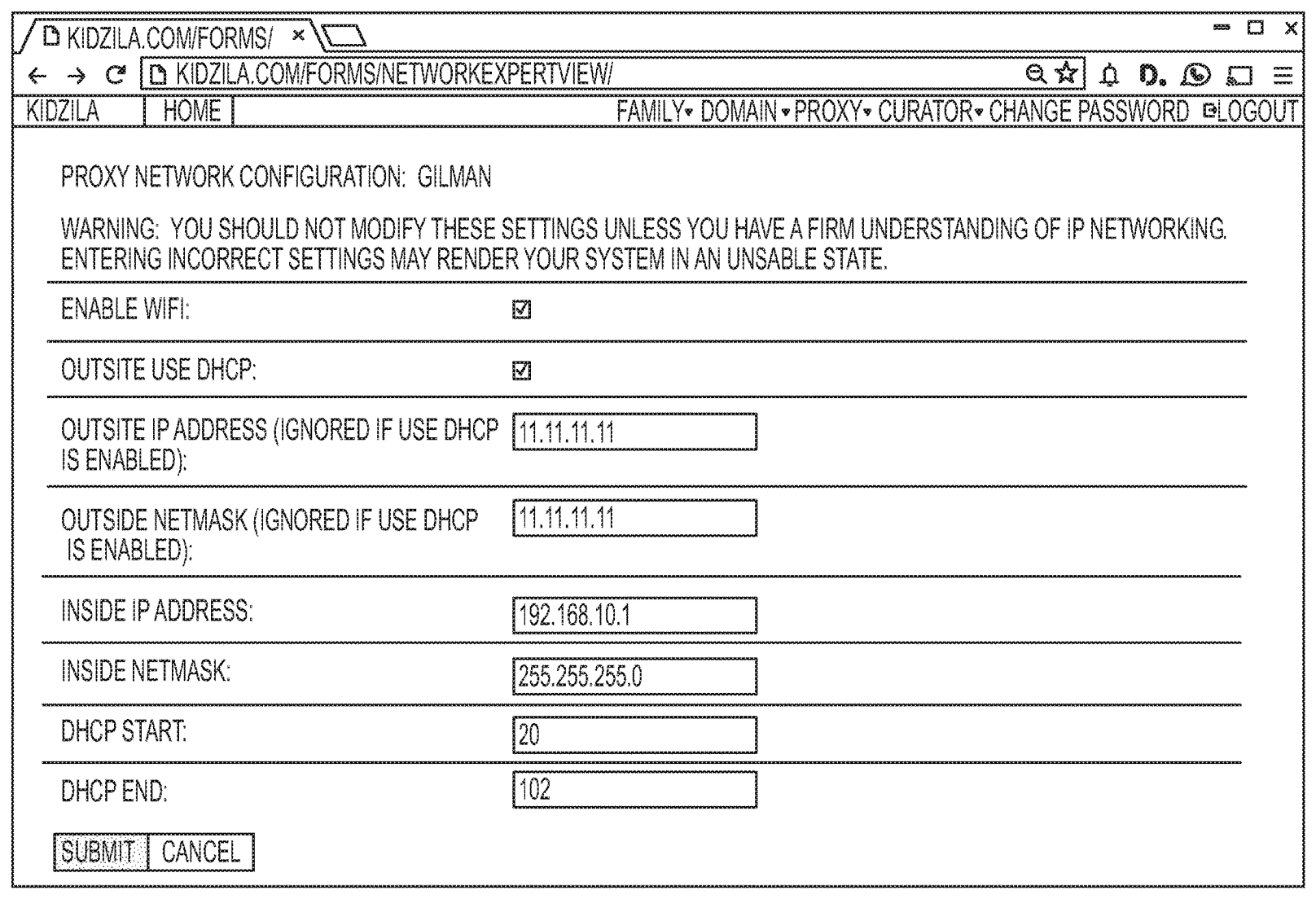

FIG. 18 is an example of a system generated page that allows control over the network configuration by an administrator or supervisor. Various IP networking configurations can be controlled from such a page. Some of the controls include for example enabling WiFi inside the network, Outside use of DHCP, Outside IP address, Outside Netmask, Outside Gateway, Inside IP address, Inside Netmask, DHCP start number, DHCP end number, etc.

FIG. 19 is an exemplary page that allows a supervisor to manage responsibilities for an individual user. This page can be viewed by the supervisor for any user under the supervisor's charge or supervision. Various information is available or detailed for the user for example, the date and time each task is created as well as the status (open, closed, pending, in process etc.), type of responsibility, description, schedule, etc. In this example schedule is shown by day of week, however, time of day, day of month or any other schedule may be used. Each item can then be modified, deleted or marked complete. Additional responsibilities, educational items, tasks and goals can be created or added for a user.

FIG. 20 is an exemplary page that allows a supervisor to view and manage tasks for a specific user. Completed tasks, open tasks and all tasks may be shown. New tasks may be created as well. Similar to the responsibilities page shown in FIG. 19, date created, status, description, and related links information is shown. Modification and deletions are possible. In some embodiments, deadlines or timelines are established for each task. Tasks may also be related to each other and completed in sequence or in series. In this manner, larger projects can be reduced to smaller tasks and assigned to users to be performed in a sequence.

FIG. 21 is an example of a home page or welcome page for a particular user. This is generally how a user interacts with the administrative part of the IACRS system. In some embodiments, the user home page shows a user their restrictions, permissions, allowances, responsibilities, tasks, goals, and progress. The welcome of home page is a quick view or dashboard of their status in the IACRS service. In the embodiment shown, the user is allowed a maximum online time and hours online are tracked. In this example, educational sites are allowed for this user but open access to content is not allowed. The particular user has responsibilities of homework, 30 minutes of book reading, practicing a musical instrument for 30 minutes and online learning. The same user also has a task assigned for creating an account and completing one lesson on the Khana academy .org website. After each responsibility or task is completed it is so marked. Goals may also be listed on this user home page. From this home page, using the options on the upper bar of the page, a user may view reports on his activity and access of content, see his schedule and change password.

Figure 22:
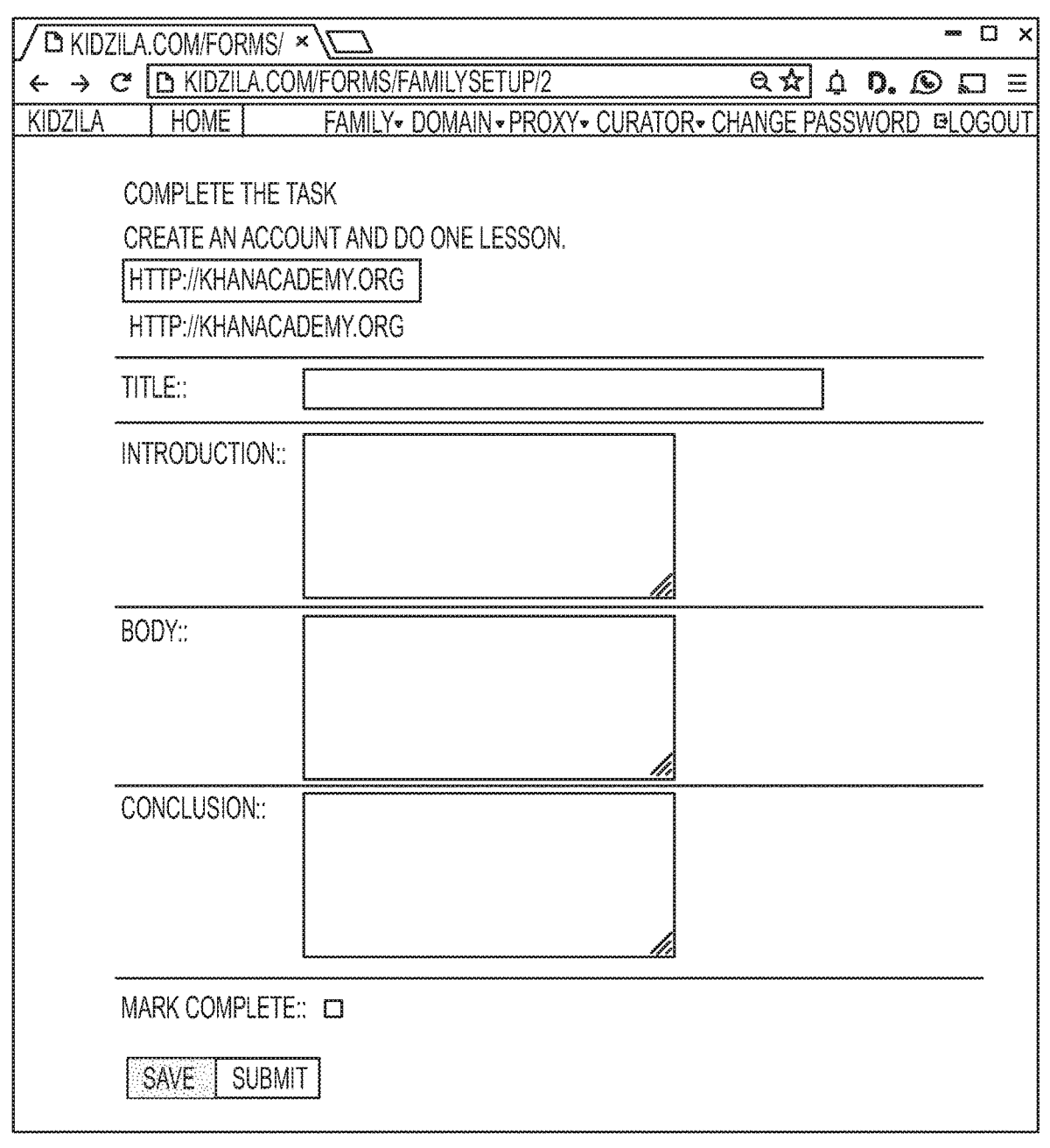

FIG. 22 is an exemplary screenshot of a page allowing a user/child to open a task and complete a task. In the specific example, the task is a "web task" and the user must complete a lesson on an external site. In this example, the user clicks-through to the external website completes a lesson and logs the completion. Third party websites may be tied into the system in this manner for educational and other purposes.

Figure 23:
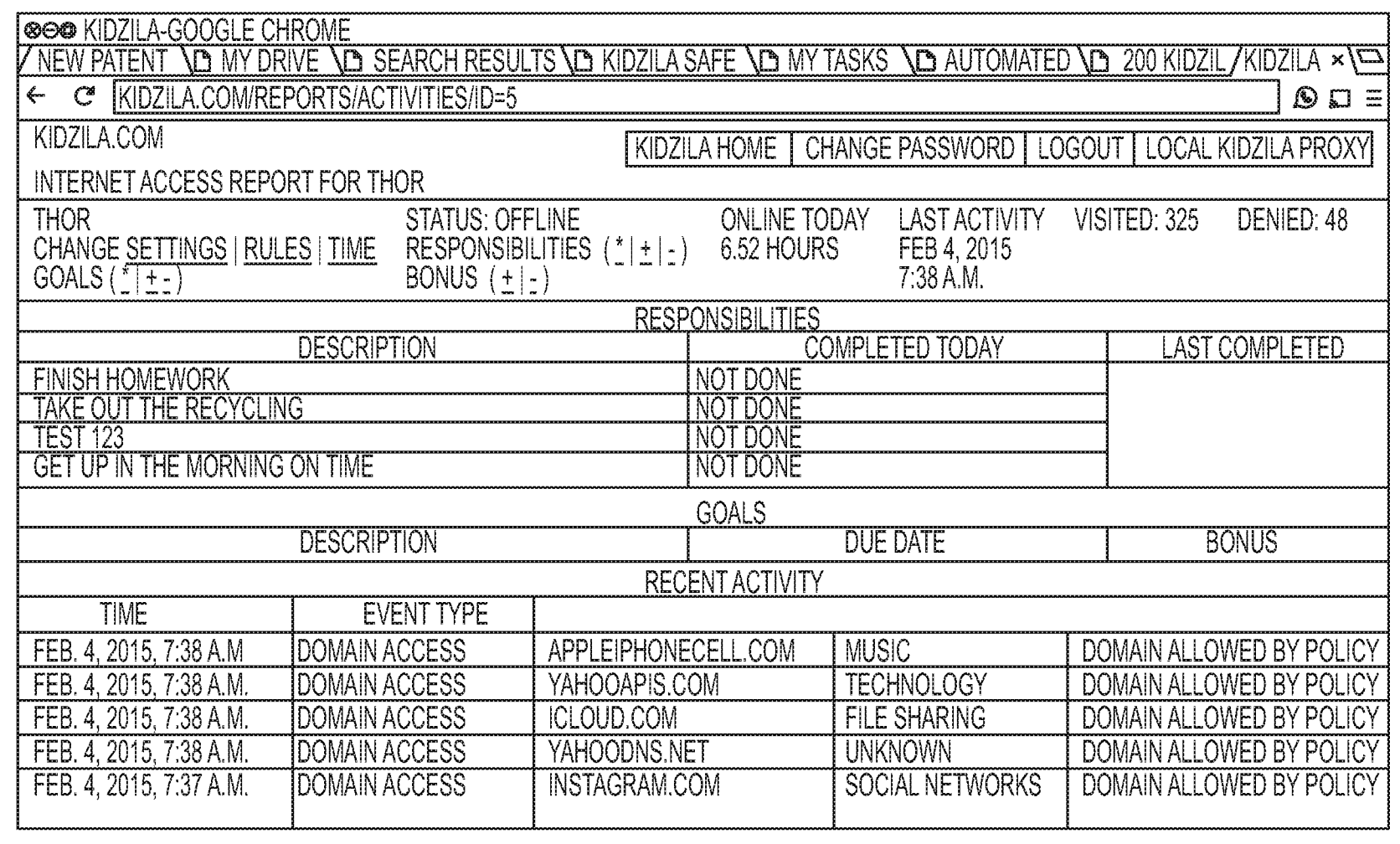

FIG. 23 is an exemplary screenshot of a page displaying a detailed internet access report for a particular user. FIG. 23 shows a combined status report and internet access report for an individual user. The page shows status of the user, time online, last activity date and time, websites visited and website/content queries denied. In addition, information on responsibilities, tasks, goals are displayed. In some embodiments, bonus information and purchases are also shown. Finally, recent activity on a query by query, date and time basis for the particular user are shown. The result of each query allowed denied or other status is provided for each query entry.

Figure 24:
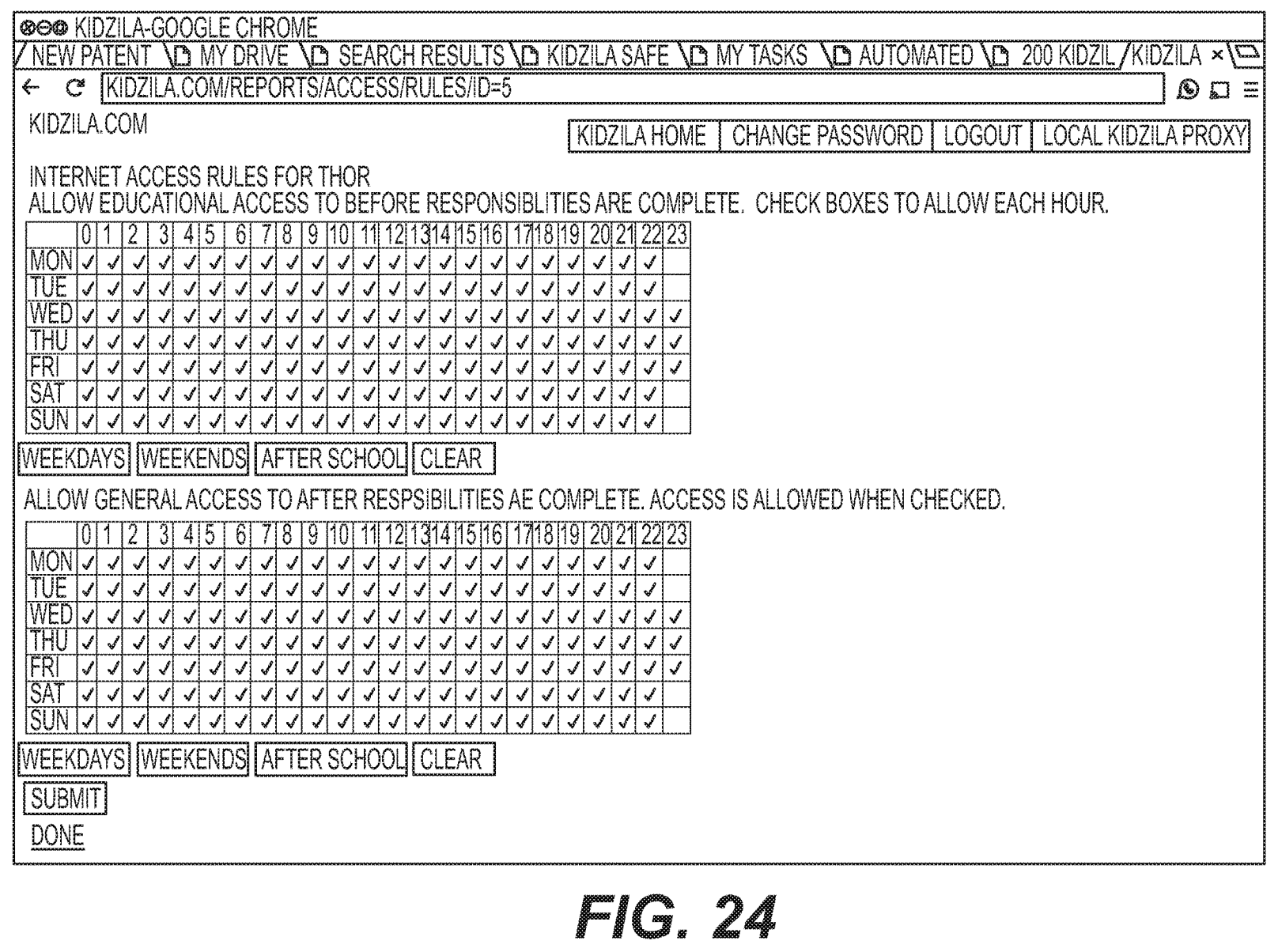

FIG. 24 is an exemplary screenshot of a page of internet access rules for a particular user by calendar and time of day which may be changed on an hourly basis. Various methods and visuals may be used to control access of content by a user in terms of time of day, week or month or after completing responsibilities, tasks, or goals. In the embodiment shown in FIG. 24, the first or top hourly chart controls access to educational content before user assigned responsibilities are complete. The second hourly chart controls access to general content after responsibilities are complete. Each box in each chart may be checked or unchecked to control user access to content. Subsets of the chart may be changed or controlled by the weekday, weekend and after school hours' buttons. The chart may also be cleared in its entirety using the clear button.

Referring to FIG. 24, while this embodiment focuses on responsibilities, tasks goals or other measures may be used instead of or in addition to responsibilities. This example also focuses on educational content and general content access, however, other content genre or types may be used in the hourly chart to control access. For example, a user's access to gaming, movies, webmail or social network content may be controlled on an hourly basis. In many embodiments, night hours are restricted access to any content by a user. These controls shown are in addition to types or genre that are completely blocked to users such as pornography, adult content, TVMA or the like.

Figure 25:
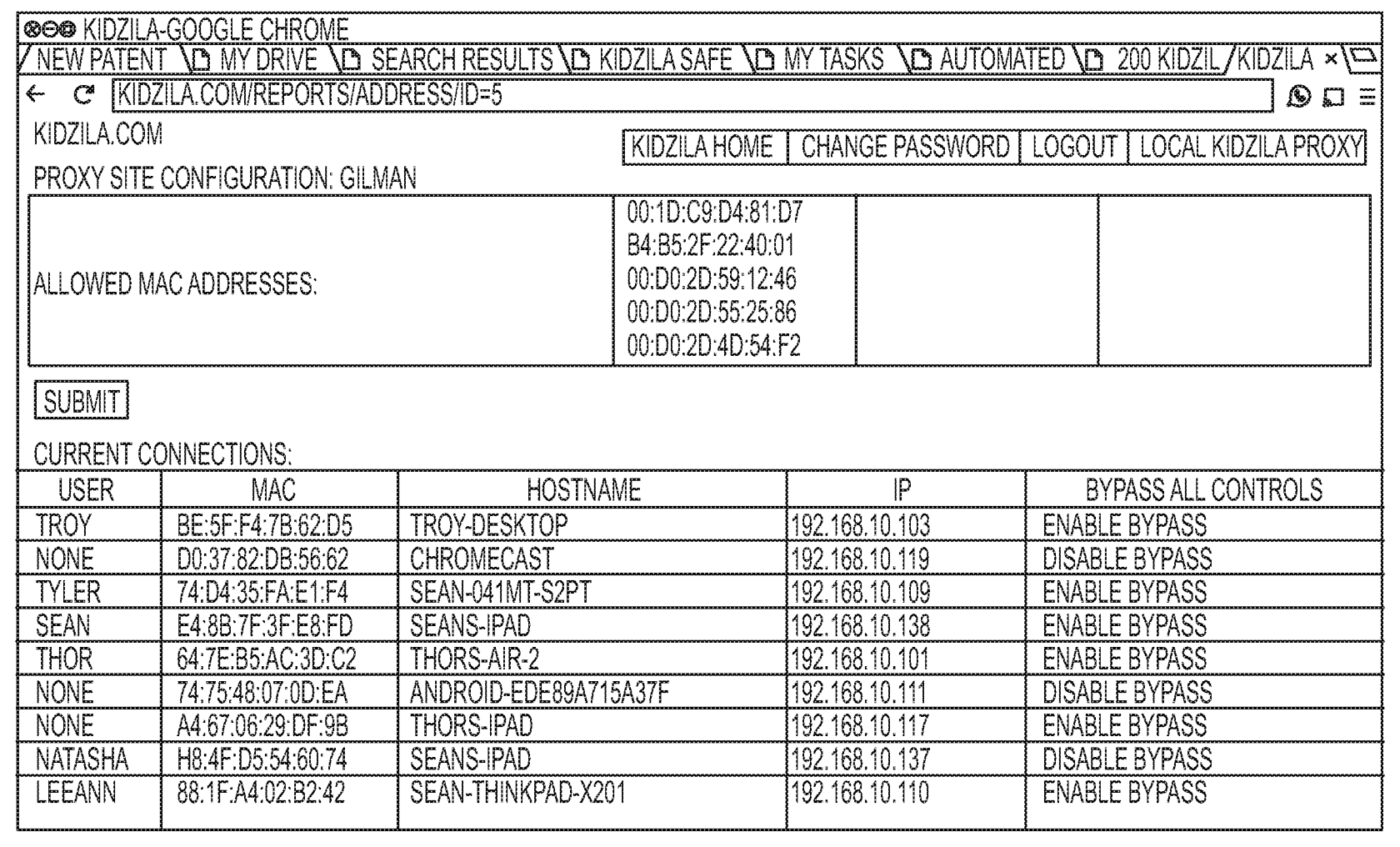

FIG. 25 is an example of a screenshot of a page used for proxy site configuration. The page allows configuration for a number of users and a number of allowed MAC addresses. For each of the user's, certain network devices are registered or allowed in the system. The MAC address are tracked for each device and, where appropriate, a user is assigned to the device and associated MAC address. Some devices remain unassigned to a user. In other words, the device is not assigned to a user for one reason or another, for example, the device is a thermostat or a security system.

Referring to FIG. 25, some of the network devices are assigned bypass status and are allowed to bypass the IACRS restricted access controls. This might be applicable for the password protected personal phone of the supervisor or parent. Once the system has this map of MAC addresses to devices and to users, the capability of close tracking of users by device is available. In many embodiments, even though a user is mapped to a device, the user must login with personal credentials to ensure individuals have not borrowed devices of other users.

Also, as shown on the page in FIG. 25, current connections organized by user and MAC addresses are displayed for a supervisor. This page also allows a supervisor with the proper authority to enable or disable bypass rights for a particular device, a particular user and/or a particular combination of device and user. Using the display or list of users mapped to MAC addresses and hostname, simplifies the supervisor's management of the systems bypass feature.

In the present disclosure, the words "unit," "device," "component," "module," and "logical module" may be used interchangeably. Anything designated as a device, unit or module may be a stand-alone module or a specialized or integrated module. A module may be modular or have modular aspects allowing it to be easily removed and replaced with another similar unit or module. Each module may be any one of, or any combination of, software, hardware, and/or firmware. Software of a logical module may be embodied on a computer readable medium such as a read/write hard disc, CDROM, Flash memory, ROM, etc. In order to execute a certain task a software program may be loaded to an appropriate processor as needed.

In the description and claims of the present disclosure, "comprise," "include," "have," and conjugates thereof are used to indicate that the object or objects of the verb are not necessarily a complete listing of members, components, elements, or parts of the subject or subjects of the verb.

It will be appreciated that the above-described apparatus, systems and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure may be implemented by combination of features and elements that have been described in association to different embodiments along the discloser. The scope of the invention is limited only by the following claims and equivalents thereof.

The foregoing description of various embodiments provides illustration and description, but is not intended to be exhaustive or to limit the invention to the precise form disclosed. Modifications and variations are possible in light of the above teachings or may be acquired from practice in accordance with the present invention. All alternative embodiments are included that do not depart from the basic scope and spirit hereof. It is to be understood that the invention is intended to cover various modifications and equivalent arrangements included within the spirit and scope of the appended claims.

What is claimed is:

1. An internet access control system comprising:
   a web server enabling system control, rule maintenance and internet usage reports;
   a user database including data on users organized by user ID;
   an access rules database with customized access rules associated with users in the user database;
   a specialized domain name server;
   an internet content ratings database configured to store internet domains and content categories;
   wherein the web server (1) receives a first message to authenticate a user identified in the user database and (2) returns an authentication token in response to the first message if the user is authenticated;
   a Specialized DNS Proxy service, interposed between (a) a network device of the authenticated user and (h) the specialized domain name server, for forwarding DNS requests from the network device to the specialized domain name server, wherein the Specialized DNS Proxy service is identified to the network device of the authenticated user as part of a DHCP (Dynamic Host Configuration Protocol) response message; and
   an HTTP proxy service interposed between the network device and the web server which forwards login messages from the network device to the web server to check against the user database and which receives the authentication token in response to the first message if the user is authenticated;
   wherein the specialized domain name server receives a second message including the authentication token identifying a requested server for which an IP address is being requested on behalf of the authenticated user associated with the authentication token and locates customized access rules associated with the authenticated user; and
   wherein the specialized domain name server grants or blocks access to the IP address of the requested internet server based upon the located customized access rules associated with the authenticated user and based on data from the internet content ratings database.

2. The internet access control system of claim 1 further comprising: a firewall interposed between the network device and the requested web site for blocking and forwarding communication traffic between the network device and the requested server.

3. The internet access control system of claim 1 wherein the customized access rules comprise rules based on one or more of the following: age of user, day of the week, elapsed time online, time of day, individual responsibilities and individual tasks.

4. The internet access control system of claim 1 wherein the specialized domain name server grants or blocks access based upon whether individual tasks are completed.

5. The internet access control system of claim 1 further comprising a database that stores a log of website requests received by user ID.

6. The internet access control system of claim 1 further comprising a report generator wherein a report is generated about online usage of the authenticated user.

7. A computerized method implemented by a computer for controlling whether a network device of a user on a first network can access a server on a second network, comprising:
  receiving, using the computer interposed between the network device and the second network, an authentication request from the web browser of the network device to authenticate the user, wherein the receiving is by an HTTP proxy service interposed between the network device and the web server which forwards login messages from the network device to the web server to check against the user database and which receives the authentication token in response to the first message if the user is authenticated;
  sending an authentication token if the authentication request from the web browser of the network device authenticates the user as an authenticated user;
  receiving, using the computer, a DNS request for an IP address of a requested server to be used by the network device on the first network, wherein the DNS request, after receipt, includes the authentication token corresponding to the authenticated user, wherein the receiving is by a Specialized DNS Proxy service interposed between (a) a network device of the authenticated user and (b) a specialized domain name server, for forwarding DNS requests from the network device to the specialized domain name server, wherein the Specialized DNS Proxy service is identified to the network device of the authenticated user as part of a DHCP (Dynamic Host Configuration Protocol) response message;
  mapping the received authentication token of the DNS request to a user ID identifying the authenticated user;
  looking-up, in a computer database, server access rules for the authenticated user using the user ID;
  determining whether the DNS request for the IP address of the requested server meets the server access rules for the authenticated user; and
  (a) providing to the network device an IF address for the requested server or (b) blocking an IP address based on a result of the determining whether the DNS request for the IP address of the requested server meets the server access rules for the authenticated user.

8. The method of claim 7 further comprising creating and maintaining, using a web-browser-based administrator interface, server access rules, including time of day limitations, for users in the computer database.

9. The method of claim 7 further comprising allowing access to a server by providing the IP address if the authenticated user has completed responsibilities in the server access rules for the user.

10. The method of claim 7 further comprising allowing access to a server by providing the IP address if the authenticated user has completed tasks in the server access rules for the authenticated user.

11. The method of claim 7 further comprising monitoring and logging on-line activity for the authenticated user.

12. The method of claim 7 further comprising generating a report by user ID of domain names requested.

13. The method of claim 7 further comprising: initiating a product purchase incentive for the authenticated user with tasks; providing the product purchase incentive to the authenticated user based on completion of tasks; and sending a message to a vendor to authorize a product purchase corresponding to the product purchase incentive.

14. The method of claim 7, wherein sending the authentication token comprises sending the authentication token to an HTTP Proxy.

15. The method of claim 7, wherein sending the authentication token comprises sending the authentication token to an HTTP Proxy as a web browser cookie.

16. A non-transitory, computer-readable medium comprising program code that, when executed by a computer interposed between a network device and a server whose IP address is being requested by the network device, causes the computer to:
  receive an authentication request from a web browser of the network device, wherein the receiving is by an HTTP proxy service interposed between the network device and the web server which forwards login messages from the network device to the web server to check against the user database and which receives the authentication token in response to the first message if the user is authenticated;
  send an authentication token if the authentication request from the web browser of the network device authenticates the user as an authenticated user;
  receive, on behalf of the network device, a DNS request including a network device ID, the authentication token corresponding to the authenticated user after receipt, and an identification of the server whose IP address is being requested by the network device, wherein the receiving is by a Specialized DNS Proxy service interposed between (a) a network device of the authenticated user and (b) a specialized domain name server, for forwarding DNS requests from the network device to the specialized domain name server, wherein the Specialized DNS Proxy service is identified to the network device of the authenticated user as part of a DHCP (Dynamic Host Configuration Protocol) response message;
  locate a user ID associated with the network device ID;
  locate server access rules associated with the user ID, wherein the server access rules are customized for the authenticated user;
  process the server access rules associated with the user ID to determine, based upon website content ratings, amount of on-line time and time of day conditions, whether to provide an IP address associated with the DNS request to the network device; and
  (a) provide to the network device an IP address for the requested server or (b) block an IP address based on whether the DNS request for the IP address of the requested server meets the website content ratings, amount of on-line time and time of day conditions for the authenticated user.

17. A non-transitory, computer-readable medium of claim 16 further comprising program code which when executed causes the computer to: determine whether the authenticated user associated with the user ID completed responsibilities and tasks assigned, and wherein the IP address associated with the DNS request is not provided unless assigned responsibilities and tasks are complete.

18. A non-transitory, computer-readable medium of claim 16 further comprising program code which when executed causes the computer to: provide user interface screens for creating for users server access rules including time of day access limitations and content by time of day limitations.

19. A non-transitory, computer-readable medium of claim 16 further comprising program code which when executed causes the computer to: store in memory records of Internet access requests and on-line activities of the authenticated user.

20. A non-transitory, computer-readable medium of claim 16 further comprising program code which when executed causes the computer to: generate a report of domain names requested by the authenticated user.

21. A non-transitory, computer-readable medium of claim 16 further comprising program code which when executed causes the computer to: create a product purchase incentive for a user with personal goals; provide the product purchase incentive to the user, wherein if the user completes the personal goals, the user is authorized to purchase a product associated with the product purchase incentive.

* * * * *